(12) United States Patent
Kinpara et al.

(10) Patent No.: US 6,777,906 B1
(45) Date of Patent: Aug. 17, 2004

(54) METHOD OF CONTROLLING INDUCTION MOTOR

(75) Inventors: Yoshihiko Kinpara, Tokyo (JP); Kei Terada, Tokyo (JP); Hisao Sakurai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 114 days.

(21) Appl. No.: 10/110,852

(22) PCT Filed: Nov. 20, 2000

(86) PCT No.: PCT/JP00/08170
§ 371 (c)(1),
(2), (4) Date: Apr. 17, 2002

(87) PCT Pub. No.: WO02/41486
PCT Pub. Date: May 23, 2002

(51) Int. Cl.$^7$ ............................................... H02P 21/00
(52) U.S. Cl. ........................ 318/727; 318/814; 318/801
(58) Field of Search ............................... 318/807–817, 318/801, 727

(56) References Cited

U.S. PATENT DOCUMENTS

| | | | | |
|---|---|---|---|---|
| 4,967,135 A | * | 10/1990 | Ashikaga et al. | 318/808 |
| 5,057,759 A | | 10/1991 | Ueda et al. | 318/616 |
| 5,371,458 A | * | 12/1994 | Heikkila | 324/772 |
| 5,481,168 A | * | 1/1996 | Mutoh et al. | 318/432 |
| 5,811,956 A | | 9/1998 | Yamamoto | 318/801 |
| 5,973,474 A | | 10/1999 | Yamamoto | 318/801 |
| 6,377,018 B2 | * | 4/2002 | Tajima et al. | 318/727 |

FOREIGN PATENT DOCUMENTS

| | | |
|---|---|---|
| JP | 7-123799 | 5/1995 |
| JP | 8-70598 | 3/1996 |
| JP | 8-86190 | 4/1996 |
| JP | 8-129420 | 5/1996 |
| JP | 10-323070 | 12/1998 |
| JP | 11-4599 | 1/1999 |
| JP | 11-341898 | 12/1999 |

OTHER PUBLICATIONS

Furuta et al., "Kiso System Riron", Corona Publishing Co., Ltd., Apr. 1994.
Kinpara et al., "Indirect Field Oriented Control Method Using Flux Observer Equivalent To The Direct Field Oriented Control Method", 1992 National Convention record of the IEE Japan–Industry Application Society, No. 10.
Kinpara et al., "Vector–Control Of Induction Motor Using Robust Optimal Observer", T. IEEE Japan, vol. 121–D, No. 8, 2001.

* cited by examiner

*Primary Examiner*—Dang Le
*Assistant Examiner*—David W. Scheuermann
(74) *Attorney, Agent, or Firm*—Leydig, Voit & Mayer, Ltd.

(57) ABSTRACT

A control device for an induction motor controlling torque generation of the induction motor with high precision includes a rotation speed detector which detects the rotation speed of the induction motor, a current detector which detects a primary current of the induction motor; an amplifying unit which amplifies deviation between an estimated primary current obtained from a magnetic flux observing device and the primary current obtained from the current detector; a magnetic flux observing device which estimates an estimated secondary magnetic flux and an estimated primary current of the induction motor based upon the rotation speed obtained from the rotation speed detector, the primary voltage of the induction motor and the deviation signal obtained from the amplifying unit, and a control unit which controls a voltage applied to the induction motor based upon the estimated secondary magnetic flux obtained from the magnetic flux observing device. In this arrangement, the amplifying unit amplifies the deviation of the primary current based upon feedback gains consisting of eight respectively independent factors. Thus, it is possible to provide torque control with high precision even at the time of low-speed operation.

7 Claims, 10 Drawing Sheets

METHOD OF CONTROLLING INDUCTION MOTOR

TECHNICAL FIELD

The present invention relates to a control device that controls torque generation of an induction motor with high precision.

BACKGROUND ART

Conventionally, a vector control method is used in induction motors to drive the induction motors with high precision. The vector control method is a method of controlling a d-axis current and a q-axis current on the rotation coordinate axes (d–q axes) that rotate in synchronism with a secondary magnetic flux to respectively desired values. Generally, it is impossible to directly observe the secondary magnetic flux due to hardware limitations. Therefore, there is proposed a sliding frequency vector controlling method in which secondary magnetic flux is estimated based upon a primary current of the induction motor.

However, in this sliding frequency vector controlling method, a value of a secondary resistance is required for calculating the secondary magnetic flux. Therefore, there arises a problem that, changes in the secondary resistance due to heat generation, etc. would cause degradation in the controlling performance.

FIG. 12 is a graph which is obtained by plotting the relationship between the torque instruction and the torque error in a conventional control device for an induction motor to which the sliding frequency vector controlling system is applied. In FIG. 12, the abscissa represents the torque instruction, and the ordinate represents the torque error (=generated torque-torque instruction). The graph in the upper half of the FIG. 12 represents the relationship between the torque instruction and the torque error when the rotation speed is 3 [rad/s], and the graph in the lower half represents the relationship between the torque instruction and the torque error when the rotation speed is 188 [rad/s]. Moreover, the solid line shows the characteristic obtained when the secondary resistance of the induction motor has increased by a factor of 1.3, and the broken line shows the characteristic obtained when the secondary resistance of the induction motor has decreased by a factor of 1/1.3.

As shown in FIG. 12, in the conventional control device for the induction motor to which the sliding frequency vector controlling system has been applied, there arises a problem that, when the value of the secondary resistance changes, a torque error is generated irrespective of the rotation speed.

A method which identifies a secondary resistance value during the driving operation of the induction motor has been proposed. However, depending on driving conditions, the estimated value of the secondary resistance is dispersed, resulting in problems with respect to the stability.

In order to solve these problems, a control device for an induction motor including a magnetic flux observing device, which calculates the secondary magnetic flux based upon the primary current and the primary voltage of the induction motor, and to which the induction motor constant is applied, has been proposed.

For example, FIG. 13 is a structural diagram which shows a prior art control device for an induction motor shown in a document "Indirect Field Oriented Control Method Using Flux Observer Equivalent To The Direct Field Oriented Control Method" (1992 National Convention Record of the IEE Japan-Industry Application Society, No.110 (pp. 466–471).

The principle of controlling by the prior art control device for an induction motor will be explained. The magnetic flux observing device, which is constituted on stationary bi-axes ($\alpha$–$\beta$ axes), is designed based upon the following equations (1) and (2).

$$\frac{d}{dt}\begin{pmatrix}\hat{i}_{\alpha s}\\ \hat{i}_{\beta s}\end{pmatrix} = A_{11}\begin{pmatrix}\hat{i}_{\alpha s}\\ \hat{i}_{\beta s}\end{pmatrix} + A_{12}\begin{pmatrix}\hat{\phi}_{\alpha r}\\ \hat{\phi}_{\beta r}\end{pmatrix} + B\begin{pmatrix}v_{\alpha s}\\ v_{\beta s}\end{pmatrix} + K_1\begin{pmatrix}\hat{i}_{\alpha s}-i_{\alpha s}\\ \hat{i}_{\beta s}-i_{\beta s}\end{pmatrix} \quad (1)$$

$$\frac{d}{dt}\begin{pmatrix}\hat{\phi}_{\alpha r}\\ \hat{\phi}_{\beta r}\end{pmatrix} = A_{21}\begin{pmatrix}\hat{i}_{\alpha s}\\ \hat{i}_{\beta s}\end{pmatrix} + A_{22}\begin{pmatrix}\hat{\phi}_{\alpha r}\\ \hat{\phi}_{\beta r}\end{pmatrix} + K_2\begin{pmatrix}\hat{i}_{\alpha s}-i_{\alpha s}\\ \hat{i}_{\beta s}-i_{\beta s}\end{pmatrix} \quad (2)$$

where, $$A_{11} = \begin{pmatrix} -\left(\frac{R_s}{\sigma L_s} + \frac{R_r(1-\sigma)}{\sigma L_r}\right) & 0 \\ 0 & -\left(\frac{R_s}{\sigma L_s} + \frac{R_r(1-\sigma)}{\sigma L_r}\right) \end{pmatrix}$$

$$A_{12} = \begin{pmatrix} \frac{MR_r}{\sigma L_s L_r^2} & \frac{P_m \omega_m M}{\sigma L_s L_r} \\ -\frac{P_m \omega_m M}{\sigma L_s L_r} & \frac{MR_r}{\sigma L_s L_r^2} \end{pmatrix}$$

$$A_{21} = \begin{pmatrix} \frac{MR_r}{L_r} & 0 \\ 0 & \frac{MR_r}{L_r} \end{pmatrix}$$

$$A_{22} = \begin{pmatrix} -\frac{R_r}{L_r} & -P_m \omega_m \\ P_m \omega_m & -\frac{R_r}{L_r} \end{pmatrix}$$

$$B = \begin{pmatrix} \frac{1}{\sigma L_s} & 0 \\ 0 & \frac{1}{\sigma L_s} \end{pmatrix}$$

In order to place the pole of the magnetic flux observing device on a conjugate complex pole or a duplex pole, square matrixes $K_1$, $K_2$ are defined by using equations (3) and (4), and $k_1$, $k_2$, $k_3$, $k_4$ are determined according to the rotation speed.

$$K_1 = \begin{pmatrix} k_1 & -k_2 \\ k_2 & k_1 \end{pmatrix} \quad (3)$$

$$K_2 = \begin{pmatrix} k_3 & -k_4 \\ k_4 & k_3 \end{pmatrix} \quad (4)$$

Therefore, when equation (1) is coordinate-converted onto rotation axes (d–q axes) with equation (2) being coordinate-converted onto the stator polar coordinates, equations (5) to (7) are obtained.

$$\frac{d}{dt}\begin{pmatrix}\hat{i}_{ds}\\ \hat{i}_{qs}\end{pmatrix} = \tilde{A}_{11}\begin{pmatrix}\hat{i}_{ds}\\ \hat{i}_{qs}\end{pmatrix} + \begin{pmatrix}\frac{MR_r}{\sigma L_s L_r^2} \\ -\frac{P_m \omega_m M}{\sigma L_s L_r}\end{pmatrix}\hat{\phi}_{ds} + B\begin{pmatrix}v_{ds}\\ v_{qs}\end{pmatrix} - K_1\begin{pmatrix}\hat{i}_{ds}-i_{ds}\\ \hat{i}_{qs}-i_{qs}\end{pmatrix} \quad (5)$$

-continued $$\frac{d}{dt}\hat{\phi}_{dr} = -\frac{R_r}{L_r}\hat{\phi}_{dr} + \frac{MR_r}{L_r}\hat{i}_{ds} - (k_3(\hat{i}_{ds} - i_{ds}) - k_4(\hat{i}_{qs} - i_{qs})) \quad (6)$$

$$\frac{d}{dt}\hat{\theta}(=\omega) = P_m\omega_m + \frac{MR_r}{L_r}\frac{\hat{i}_{qs}}{\hat{\phi}_{dr}} - \frac{k_4(\hat{i}_{ds} - i_{ds}) + k_3(\hat{i}_{qs} - i_{qs})}{\hat{\phi}_{dr}} \quad (7)$$

where the following equation is satisfied.

$$\tilde{A}_{11} = A_{11} - \begin{pmatrix} 0 & -\omega \\ \omega & 0 \end{pmatrix}$$

In other words, based upon equations (5) to (7), magnetic flux calculations that are equivalent to the magnetic flux observing device on the α–β axes can be obtained on the d–q axes.

With respect to the two square matrixes $K_1$, $K_2$, those that have been designed on the stationary bi-axes are applied. In other words, square matrixes $K_1$, $K_2$ are defined by equation (3) and equation (4), and according to rotation speeds, $k_1$, $k_{21}$, $k_3$ and $k_4$ are determined. In this case, between $K_1$ and K2, the relationship represented by equation (8) is always satisfied.

$$K_1K_2 = K_2K_1 \quad (8)$$

Here, the relationship between mutually commutative matrixes $K_1$, $K_2$ refers to the relationship satisfying a commutative rule. Here, equations (5) to (7) can be rewritten to equations (9) to (13).

$$\begin{pmatrix} z_1 \\ z_2 \end{pmatrix} = K_1 \begin{pmatrix} \hat{i}_{ds} - i_{ds} \\ \hat{i}_{qs} - i_{qs} \end{pmatrix} \quad (9)$$

$$\begin{pmatrix} z_3 \\ z_4 \end{pmatrix} = K_2 \begin{pmatrix} \hat{i}_{ds} - i_{ds} \\ \hat{i}_{qs} - i_{qs} \end{pmatrix} \quad (10)$$

$$\frac{d}{dt}\begin{pmatrix} \hat{i}_{ds} \\ \hat{i}_{qs} \end{pmatrix} = \tilde{A}_{11}\begin{pmatrix} \hat{i}_{ds} \\ \hat{i}_{qs} \end{pmatrix} + \begin{pmatrix} \frac{MR_r}{\sigma L_s L_r^2} \\ -\frac{P_m\omega_m M}{\sigma L_s L_r} \end{pmatrix}\hat{\phi}_{ds} + B\begin{pmatrix} v_{ds} \\ v_{qs} \end{pmatrix} - \begin{pmatrix} z_1 \\ z_2 \end{pmatrix} \quad (11)$$

$$\frac{d}{dt}\hat{\phi}_{dr} = -\frac{R_r}{L_r}\hat{\phi}_{dr} + \frac{MR_r}{L_r}\hat{i}_{ds} - z_3 \quad (12)$$

$$\frac{d}{dt}\hat{\theta}(=\omega) = P_m\omega_m + \left(\frac{MR_r}{L_r}\hat{i}_{qs} - z_4\right) + \hat{\phi}_{dr} \quad (13)$$

Therefore, based upon equations (9) to (13), it is possible to obtain the phase and amplitude of an estimated secondary magnetic flux with the same precision as a magnetic flux observing device that is constituted on the stationary bi-axes (α–β axes). Thus, by controlling the d-axis current and the q-axis current to respectively desired different values based upon this phase, it becomes possible to suppress degradation in the control performance due to the secondary resistance change.

The construction of a conventional control device for an induction motor shown in FIG. 13 will be explained. This control device for the induction motor 1 is provided with a rotation speed detector 2, a current detector 3, a magnetic flux observing device 4, a control unit 5, an amplifying unit 6 and a coordinate converter 7 which coordinate-converts a primary current obtained from the current detector 2 onto a rotary coordinate axes (d–q axes) based upon the phase $\hat{\theta}$ of the estimated secondary magnetic flux. Moreover, the control unit 5 is provided with a current control device 8, a coordinate converter 9 and a PWM inverter 10.

The amplifying unit 6 is provided with subtracters 11, 12, gain calculators 13, 14. The rotation speed detector 2 detects the rotation speed $\omega_m$ of the induction motor 1, and the current detector 3 detects primary currents $i_{us}$, $i_{vs}$ of the induction motor 1.

Based upon primary voltage instructions $V_{ds}^*$, $V_{qs}^*$ to be applied to the induction motor 1 and deviation signals $Z_1$, $Z_2$, $Z_3$, $Z_4$ obtained from the amplifying unit 6, the magnetic flux observing device 4 estimates the amplitude $\hat{\Phi}_{dk}$ of the estimated secondary magnetic flux, the phase $\hat{\theta}$ of the estimated secondary magnetic flux, the d-axis component $i_{ds}$ of the estimated primary current and the q-axis component, $i_{qs}$ of the estimated primary current in the induction motor 1.

Based upon the phase $\hat{\theta}$ of the estimated secondary magnetic flux obtained by the magnetic flux observing device 4, the control unit 5 controls the voltage to be applied to the induction motor 1 so that the primary current is made coincident with a desired current given on the d–q axes. In other words, the current control device 8 outputs primary voltage instructions $V_{ds}^*$, $V_{qs}^*$ onto the d–q axes so that the d-axis primary current $i_{ds}$, q-axis primary current $i_{qs}$ are respectively made coincident with desired currents (d-axis primary current instruction $i_{ds}^*$, q-axis primary current instruction $i_{qs}^*$) given on the d–q axes, and based upon the phase $\hat{\theta}$ of the estimated secondary magnetic flux, the coordinate converter 9 calculates three-phase voltage instructions $V_{us}^*$, $V_{vs}^*$, $V_{ws}^*$. Based upon these three-phase voltage instructions $V_{us}^*$, $V_{vs}^*$, $V_{ws}^*$, the PWM inverter 10 applies three-phase voltages $V_{us}$, $V_{vs}$, $V_{ws}$ to the induction motor 1.

The amplifying unit 6 obtains the output of the current detector 3 as a primary current on the d–q axes via the coordinate converter 7, and amplifies the deviation of the estimated primary current on the d–q axes obtained from the magnetic flux observing device 4 and the primary current on the primary current on the d–q axes based upon the two square matrixes $K_1$, $K_2$, and outputs the resulting signals as deviation signals $Z_1$, $Z_2$, $Z_3$, $Z_4$.

In other words, the subtracter 11 calculates the deviation $\hat{i}_{ds} - i_{ds}$ between the d-axis estimated primary current $\hat{i}_{ds}$ obtained from the magnetic flux observing device 4 and d-axis primary current $i_{ds}$ obtained from the coordinate converter 7. The subtracter 12 calculates the deviation $\hat{i}_{qs} - i_{qs}$ between the q-axis estimated primary current $\hat{i}_{qs}$ obtained from the magnetic flux observing device 4 and q-axis primary current $\hat{i}_{qs}$ obtained from the coordinate converter 7. The gain calculator 13 calculates deviation signals $Z_1$, $Z_2$ based upon the first square matrix $K_1$ of equation (9), and the gain calculator 14 calculates deviation signals $Z_3$, $z_4$ based upon the second square matrix $K_2$. Here, since the first square matrix and the second square matrix are functions of the rotation speed, the gain calculators 13, 14 provide functions of the rotation speed obtained from the rotation speed detector 2.

FIG. 14 is a drawing which shows an inner construction of the magnetic flux observing device 4. The magnetic flux observing device 4 is provided with matrix calculators 15 to 17, gain calculators 18 to 21, integrators 22 to 25, adders 26 to 30, an adder-subtracter 31, subtracters 32 to 34 and a divider 35.

The gain calculator 21 multiplies the output $\omega_m$ of the rotation speed detector 2 by Pm to output Pm·$\omega_m$. The gain calculator 16 to which the output $\hat{i}_{ds}$ of the integrator 22 and the output $\hat{i}_{qs}$ of the integrator 23 are input calculates the first term on the right-hand side of equation (11) based upon the output ω of the adder 30. The gain calculator 17 to which the output $\hat{\Phi}_{dr}$ of the integrator 24 is input calculates the second term on the right-hand side of equation (11) based upon the output Pm·ω$_m$ of the gain calculator 21. The gain calculator 15 to which the primary voltage instructions V$_{ds}$*, V$_{qs}$* obtained from the control unit 5 are input calculates the third term on the right-hand side of equation (11).

The right-hand side of equation (11) is calculated by the adders 26, 27, 28, 29 and the subtracters 33, 34, and the resulting differentiation values $\dot{i}_{ds}$, $\dot{i}_{qs}$ are input to the integrators 22, 23. The integrators 22, 23 respectively integrate the differentiation values $\dot{i}_{ds}$, $\dot{i}_{qs}$, and outputs values $\hat{i}_{ds}$, $\hat{i}_{qs}$.

The gain calculator 19 to which the output $\hat{\Phi}_{dr}$ of the integrator 24 is input calculates the first term on the right-hand side of equation (12). The gain calculator 18 to which the output $\hat{i}_{ds}$ of the integrator 22 is input calculates the second term on the right-hand side of equation (12). The adder-subtracter 31 calculates the right-hand side of equation (12) to input the differentiation value of $\hat{\Phi}_{dr}$ to the integrator 24. The integrator 24 integrates the differentiation value of $\hat{\Phi}_{dr}$ to output $\hat{\Phi}_{dr}$.

The gain calculator 20, the subtracter 32 and the divider 35 are used to calculate the second term of the right-hand side of equation (13). The adder 30 calculates the right-hand side of equation (13) to output the differentiation value of $\hat{\theta}$, that is, ω. The integrator 25 integrates the output ω of the adder 30 to output $\hat{\theta}$.

In this manner, based upon the rotation speed obtained from the rotation speed detector 2, the primary voltage instructions V$_{ds}$*, V$_{qs}$* of the induction motor 1 and the deviation signals Z$_1$, Z$_2$, Z$_3$, Z$_4$ obtained from the amplifying unit 6, the magnetic flux observing device 4 calculates the estimated secondary magnetic fluxes $\hat{\Phi}_{dr}$, $\hat{\theta}$ and the estimated primary current $\hat{i}_{ds}$, $\hat{i}_{qs}$.

FIG. 15 is a graph in which the relationship between the torque instruction and the torque error in a conventional control device of an induction motor to which the magnetic flux observing device shown in FIGS. 13 and 14 are applied is plotted. In FIG. 15, the abscissa represents the torque instruction, and the ordinate represents the torque error (=generated torque-torque instruction). The graph in the upper half of FIG. 15 shows a state in which the rotation speed is set to 3 [rad/s] and the graph in the lower half of FIG. 15 shows a state in which it is set to 188 [rad/s]. Moreover, the solid line represents a characteristic when the secondary resistance of the induction motor 1 has increased by a factor of 1.3, and the broken line represents a characteristic when the secondary resistance of the induction motor 1 has reduced by a factor of 1/1.3.

As shown by comparisons between FIG. 12 and FIG. 15, in comparison with the control device of an induction motor to which the sliding frequency vector control system is applied, the conventional control device of an induction motor to which the magnetic flux observing device shown in FIGS. 13 and 14 is applied makes it possible to reduce the torque error in the instance of the rotation frequency of 188 [rad/s] without the necessity of estimating the secondary resistance during the driving of the induction motor 1.

However, a problem has been raised in which, in a low-speed range such as 3 [rad/s] in the rotation frequency, it exerts only small effects. The reason for this is as follows. In the conventional control device of an induction motor, since there is a limitation that, upon designing two square matrixes K$_1$ and K$_2$ of the amplifying unit 6, K$_1$ and K$_2$ need to be mutually variable, the effects of the induction motor constant error to resistors, etc. cannot be suppressed optimally.

In particular, in general, electric vehicles such as electric cars are driven by torque control, and during the driving of an electric car, the greatest torque is required at the time of activating the car and stopping the car. Therefore, in a range with the speed being close to zero, it is required to provide a torque control with high precision in both of the generating and re-generating operations.

Moreover, in a printing machine, machine parts are connected to a motor through many gears. Therefore, at the time of activation, the motor is initially rotated at a minimum speed and gradually rotated at higher speeds. In this case, variations in the precision in torque control would cause variations in the speed response in controlling the speed. Poor precision in the torque control at the time of low speeds causes degradation in the reproducibility at the time of starting or stopping the driving operation or in the driving operations in summer and in winter, resulting in difficulty in adjusting the torque control.

DISCLOSURE OF THE INVENTION

The present invention has been achieved in order to solve the above problems. It is an object of this invention to provide a control device for an induction motor which applies two square matrixes that can optimally suppress influences of motor constant errors in resistors, etc. to an amplifying unit 6 so that torque errors caused by the influences of motor constant errors in resistors, etc., are properly suppressed, and a control method for such a device.

In order to solve this problem, the control device for an induction motor according to the present invention is provided with a rotation speed detector which detects the rotation speed of an induction motor, a current detector which detects a primary current of the induction motor, an amplifying unit which amplifies a deviation between an estimated primary current obtained from a magnetic flux observing device and the primary current obtained by the current detector, a magnetic flux observing device which estimates an estimated secondary magnetic flux and an estimated primary current of the induction motor based upon the rotation speed obtained from the rotation speed detector, the primary voltage of the induction motor and the deviation signal obtained from the amplifying unit, and a control unit which controls a voltage to be applied to the induction motor based upon the estimated secondary magnetic flux obtained from the magnetic flux observing device, and in this arrangement, the amplifying unit is allowed to amplify the deviation of the primary current based upon two square matrixes H$_1$, H$_2$ that do not satisfy a commutative rule, that is, feedback gains consisting of 8 respectively independent factors, therefore, without the limitation of having to place the pole of the magnetic flux observing device on the conjugate complex pole or the duplex pole, it is possible to reduce degradation in the torque control precision caused by the motor constant errors.

According to the control device for an induction motor of the next invention, in the above invention, the amplifying unit determines the feedback gain based upon the rotation angular velocity, therefore, even when a variable speed driving operation is conducted, it is possible to suppress degradation in the torque control precision caused by the motor constant errors.

According to the control device for an induction motor of the next invention, in the above invention, the amplifying unit determines the feedback gain based upon a sliding angle frequency, therefore, even when a load torque varies, it is possible to suppress degradation in the torque control precision caused by induction motor constant errors.

According to the control device for an induction motor of the next invention, in the above invention, based upon both of the rotation angular velocity and the sliding angle frequency, the amplifying unit determines the feedback gain so that even when a variable-speed operation is conducted or the load torque varies, it is possible to suppress degradation in the torque control precision caused by induction motor constant errors.

According to the control device for an induction motor of the next invention, in the above invention, the amplifying unit is allowed to amplify the primary current based upon a feedback gain $$\begin{pmatrix} H_1 \\ H_2 \end{pmatrix}$$

consisting of 8 independent elements that satisfy the following equations, therefore, it is possible to suppress degradation in the torque control precision caused by any motor constant errors, $$\begin{pmatrix} H_1 \\ H_2 \end{pmatrix} = PC^\tau (D_2 D_2^\tau)^{-1}$$

where, $$PA^\tau + AP - PC^\tau (D_2 D_2^\tau)^{-1} CP + B_2 B_2^\tau = 0$$

$$A = \begin{pmatrix} a_{11} & \omega & a_{12} & 0 \\ -\omega & a_{11} & 0 & a_{12} \\ a_{21} & 0 & a_{22} & \omega - P_m \omega_m \\ 0 & a_{21} & -(\omega - P_m \omega_m) & a_{22} \end{pmatrix}$$

$$C = \begin{pmatrix} c_1 & 0 & c_2 & 0 \\ 0 & c_1 & 0 & c_2 \end{pmatrix}$$

$$a_{11} = -\zeta^{-1} L_r R_s$$
$$a_{12} = \zeta^{-1} M R_s$$
$$a_{21} = \zeta^{-1} M R_r$$
$$a_{22} = -\zeta^{-1} L_s R_r$$
$$c_1 = \zeta^{-1} L_r$$
$$c_2 = -\zeta^{-1} M$$
$$\zeta = L_s L_r - M^2$$

$B_2$: arbitrary matrix,
$D_2$: arbitrary matrix,
$\omega$: primary angular velocity of the induction motor
$\omega_m$: rotation angular velocity of the induction motor
$\omega_s$: sliding angular velocity of the induction motor
$P_m$: polar logarithm
$R_s$: primary resistance value of the induction motor
$R_r$: secondary resistance value of the induction motor
$L_s$: primary inductance value of the induction motor
$L_r$: secondary inductance value of the induction motor
M: mutual inductance value of the induction motor.

According to the control device for an induction motor of the next invention, in this invention, the amplifying unit is allowed to amplify the deviation of the primary current based upon a feedback gain $$\begin{pmatrix} H_1 \\ H_2 \end{pmatrix}$$

consisting of 8 independent elements that satisfy the following equations, therefore, it is possible to suppress degradation in the torque control precision caused by any primary resistance errors and secondary resistance errors, $$\begin{pmatrix} H_1 \\ H_2 \end{pmatrix} = PC^\tau (D_2 D_2^\tau)^{-1}$$

where $$a_{11} = -\zeta^{-1} L_r R_s$$
$$a_{12} = \zeta^{-1} M R_s$$
$$a_{21} = \zeta^{-1} M R_r$$
$$a_{22} = -\zeta^{-1} L_s R_r$$
$$c_1 = \zeta^{-1} L_r$$
$$c_2 = -\zeta^{-1} M$$
$$\zeta = L_s L_r - M^2$$
$$PA^\tau + AP - PC^\tau (D_2 D_2^\tau)^{-1} CP + B_2 B_2^\tau = 0$$

$$A' = \begin{pmatrix} a_{11} & \omega & a_{12} & 0 \\ -\omega & a_{11} & 0 & a_{12} \\ a_{21} & 0 & a_{22} & \omega - P_m \omega_m \\ 0 & a_{21} & -(\omega - P_m \omega_m) & a_{22} \end{pmatrix}$$

$$B_2 = \begin{pmatrix} R_s \\ \dfrac{R_s}{R_r} L_r (\omega - P_m \omega_m) \\ 0 \\ -M(\omega - P_m \omega_m) \end{pmatrix}$$

$$C = \begin{pmatrix} c_1 & 0 & c_2 & 0 \\ 0 & c_1 & 0 & c_2 \end{pmatrix}$$

$$D_2 = \begin{pmatrix} \varepsilon & 0 \\ 0 & \varepsilon \end{pmatrix}$$

$\epsilon$: arbitrary positive value.

According to the control device for an induction motor of the next invention, in the above invention, the amplifying unit is allowed to amplify the deviation of the primary current based upon a feedback gain $$\begin{pmatrix} H_1 \\ H_2 \end{pmatrix}$$

consisting of 8 independent elements that satisfy the following equations, therefore, it is possible to suppress degradation in the torque control precision caused by any secondary resistance errors, $$\begin{pmatrix} H_1 \\ H_2 \end{pmatrix} = PC^\tau (D_2 D_2^\tau)^{-1}$$

where $$PA^T + AP - PC^\tau (D_2 D_2^\tau)^{-1} CP + B_2 B_2^\tau = 0$$

$$A' = \begin{pmatrix} a_{11} & \omega & a_{12} & 0 \\ -\omega & a_{11} & 0 & a_{12} \\ a_{21} & 0 & a_{22} & \omega - P_m \omega_m \\ 0 & a_{21} & -(\omega - P_m \omega_m) & a_{22} \end{pmatrix}$$

-continued $$B_2 = \begin{pmatrix} 0 \\ 0 \\ 0 \\ 1 \end{pmatrix}$$

$$C = \begin{pmatrix} c_1 & 0 & c_2 & 0 \\ 0 & c_1 & 0 & c_2 \end{pmatrix}$$

$$D_2 = \begin{pmatrix} \varepsilon & 0 \\ 0 & \varepsilon \end{pmatrix}$$

ε: arbitrary positive value.

BEST MODE FOR CARRYING OUT THE INVENTION

Figure 1:
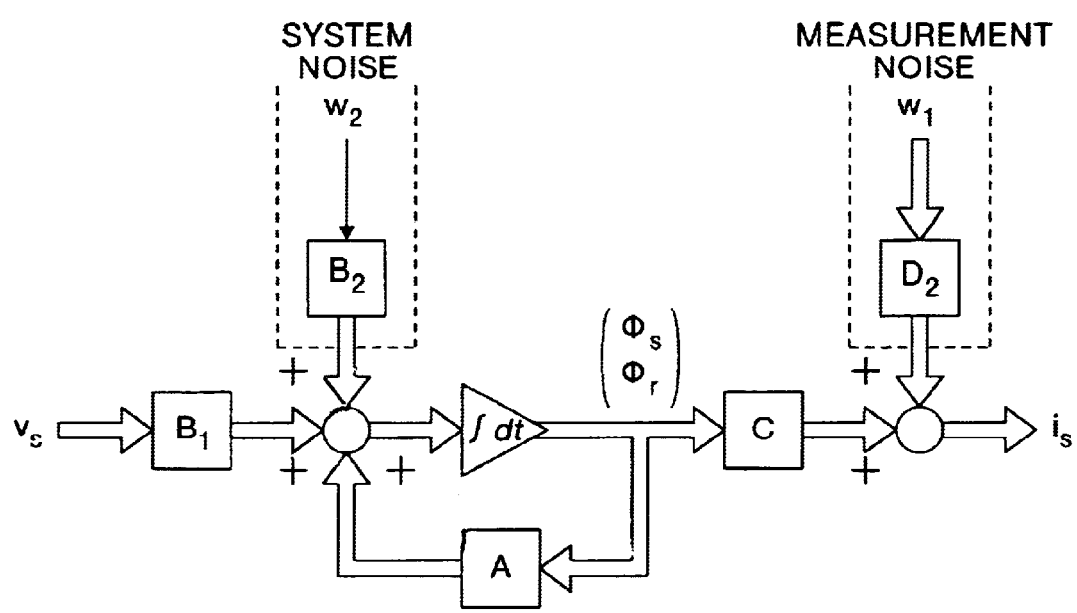
FIG. 1 is a block diagram which explains the contents of control of a control device for an induction motor when there is any resistance error.

Embodiments of a control device for an induction motor according to the present invention will be explained in details below with reference to the accompanying drawings.

First Embodiment

First, a first embodiment of the present invention will be explained. The operation principle of this control device for an induction motor is explained before a specific construction of the first embodiment of the present invention is explained. First, equations of state of the induction motor on the d–q axes are represented by the following equations (14) to (16), $$\frac{d}{dt}\begin{pmatrix}\phi_{ds}\\ \phi_{qs}\end{pmatrix} = \begin{pmatrix}a_{11} & \omega \\ -\omega & a_{11}\end{pmatrix}\begin{pmatrix}\phi_{ds}\\ \phi_{qs}\end{pmatrix} + \begin{pmatrix}a_{12} & 0 \\ 0 & a_{12}\end{pmatrix}\begin{pmatrix}\phi_{dr}\\ \phi_{qr}\end{pmatrix} + \begin{pmatrix}v_{ds}\\ v_{qs}\end{pmatrix} \quad (14)$$

$$\frac{d}{dt}\begin{pmatrix}\phi_{dr}\\ \phi_{qr}\end{pmatrix} = \begin{pmatrix}a_{21} & 0 \\ 0 & a_{21}\end{pmatrix}\begin{pmatrix}\phi_{ds}\\ \phi_{qs}\end{pmatrix} + \begin{pmatrix}a_{22} & \omega - P_m\omega_m \\ -(\omega - P_m\omega_m) & a_{22}\end{pmatrix}\begin{pmatrix}\phi_{dr}\\ \phi_{qr}\end{pmatrix} \quad (15)$$

$$\begin{pmatrix}i_{ds}\\ i_{qs}\end{pmatrix} = \begin{pmatrix}c_1 & 0 \\ 0 & c_1\end{pmatrix}\begin{pmatrix}\phi_{ds}\\ \phi_{qs}\end{pmatrix} + \begin{pmatrix}c_2 & 0 \\ 0 & c_2\end{pmatrix}\begin{pmatrix}\phi_{dr}\\ \phi_{qr}\end{pmatrix} \quad (16)$$

where $$a_{11} = -\zeta^{-1}L_rR_s$$
$$a_{12} = \zeta^{-1}MR_s$$
$$a_{21} = \zeta^{-1}MR_r$$
$$a_{22} = -\zeta^{-1}L_sR_r$$
$$c_1 = \zeta^{-1}L_r$$
$$c_2 = -\zeta^{-1}M$$
$$\zeta = L_sL_r - M^2$$

Therefore, it is possible to construct a magnetic flux observing device on the d–q axes by using equations (17) to (19).

$$\frac{d}{dt}\begin{pmatrix}\hat{\phi}_{ds}\\ \hat{\phi}_{qs}\end{pmatrix} = \begin{pmatrix}a_{11} & \omega \\ -\omega & a_{11}\end{pmatrix}\begin{pmatrix}\hat{\phi}_{ds}\\ \hat{\phi}_{qs}\end{pmatrix} + \begin{pmatrix}a_{12} & 0 \\ 0 & a_{12}\end{pmatrix}\begin{pmatrix}\hat{\phi}_{dr}\\ \hat{\phi}_{qr}\end{pmatrix} + \begin{pmatrix}v_{ds}\\ v_{qs}\end{pmatrix} - H_1\begin{pmatrix}\hat{i}_{ds} - i_{ds}\\ \hat{i}_{qs} - i_{qs}\end{pmatrix} \quad (17)$$

$$\frac{d}{dt}\begin{pmatrix}\hat{\phi}_{dr}\\ \hat{\phi}_{qr}\end{pmatrix} = \begin{pmatrix}a_{21} & 0 \\ 0 & a_{21}\end{pmatrix}\begin{pmatrix}\hat{\phi}_{ds}\\ \hat{\phi}_{qs}\end{pmatrix} + \begin{pmatrix}a_{22} & \omega - P_m\omega_m \\ -(\omega - P_m\omega_m) & a_{22}\end{pmatrix}\begin{pmatrix}\hat{\phi}_{dr}\\ \hat{\phi}_{qr}\end{pmatrix} - H_2\begin{pmatrix}\hat{i}_{ds} - i_{ds}\\ \hat{i}_{qs} - i_{qs}\end{pmatrix} \quad (18)$$

$$\begin{pmatrix}\hat{i}_{ds}\\ \hat{i}_{qs}\end{pmatrix} = \begin{pmatrix}c_1 & 0 \\ 0 & c_1\end{pmatrix}\begin{pmatrix}\hat{\phi}_{ds}\\ \hat{\phi}_{qs}\end{pmatrix} + \begin{pmatrix}c_2 & 0 \\ 0 & c_2\end{pmatrix}\begin{pmatrix}\hat{\phi}_{dr}\\ \hat{\phi}_{qr}\end{pmatrix} \quad (19)$$

As described above, in the induction motor, during a driving operation, the primary resistance and the secondary resistance of the induction motor come to change due to heat generation, etc. For example, when Rs, Rr change to (1+k) times, equations (14), (15) change to equations (20), (21), respectively.

$$\frac{d}{dt}\begin{pmatrix}\phi_{ds}\\\phi_{qs}\end{pmatrix}=\begin{pmatrix}a_{11}+\Delta a_{11} & \omega\\-\omega & a_{11}+\Delta a_{11}\end{pmatrix}\begin{pmatrix}\phi_{ds}\\\phi_{qs}\end{pmatrix}+\begin{pmatrix}a_{12}+\Delta a_{12} & 0\\0 & a_{12}+\Delta a_{12}\end{pmatrix}\begin{pmatrix}\phi_{dr}\\\phi_{qr}\end{pmatrix}+\begin{pmatrix}v_{ds}\\v_{qs}\end{pmatrix} \quad (20)$$

$$\frac{d}{dt}\begin{pmatrix}\phi_{dr}\\\phi_{qr}\end{pmatrix}=\begin{pmatrix}a_{21}+\Delta a_{21} & 0\\0 & a_{21}+\Delta a_{21}\end{pmatrix}\begin{pmatrix}\phi_{ds}\\\phi_{qs}\end{pmatrix}+\begin{pmatrix}a_{22}+\Delta a_{22} & \omega-P_m\omega_m\\-(\omega-P_m\omega_m) & a_{22}+\Delta a_{22}\end{pmatrix}\begin{pmatrix}\phi_{dr}\\\phi_{qr}\end{pmatrix} \quad (21)$$

where $\Delta a_{11}=k\zeta^{-1}L_rR_s$
$\Delta a_{12}=k\zeta^{-1}MR_s$
$\Delta a_{21}=k\zeta^{-1}MR_r$
$\Delta a_{22}=k\zeta^{-1}L_sR_r$ The equations (20), (21) can be written as the equation (22).

$$\frac{d}{dt}\begin{pmatrix}\phi_{ds}\\\phi_{qs}\\\phi_{dr}\\\phi_{qr}\end{pmatrix}=\begin{pmatrix}a_{11}+\Delta a_{11} & \omega & a_{12}+\Delta a_{12} & 0\\-\omega & a_{11}+\Delta a_{11} & 0 & a_{12}+\Delta a_{12}\\a_{21}+\Delta a_{21} & 0 & a_{22}+\Delta a_{22} & \omega-P_m\omega_m\\0 & a_{21}+\Delta a_{21} & -(\omega-p_m\omega_m) & a_{22}+\Delta a_{22}\end{pmatrix}\begin{pmatrix}\phi_{ds}\\\phi_{qs}\\\phi_{dr}\\\phi_{qr}\end{pmatrix}+\begin{pmatrix}v_{ds}\\v_{qs}\\0\\0\end{pmatrix} \quad (22)$$

$$=\begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix}\begin{pmatrix}\phi_{ds}\\\phi_{qs}\\\phi_{dr}\\\phi_{qr}\end{pmatrix}+\begin{pmatrix}v_{ds}\\v_{qs}\\0\\0\end{pmatrix}+\begin{pmatrix}\Delta a_{11} & 0 & \Delta a_{12} & 0\\0 & \Delta a_{11} & 0 & \Delta a_{12}\\\Delta a_{21} & 0 & \Delta a_{22} & 0\\0 & \Delta a_{21} & 0 & \Delta a_{22}\end{pmatrix}\begin{pmatrix}\phi_{ds}\\\phi_{qs}\\\phi_{dr}\\\phi_{qr}\end{pmatrix}$$

$$=\begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix}\begin{pmatrix}\phi_{ds}\\\phi_{qs}\\\phi_{dr}\\\phi_{qr}\end{pmatrix}+\begin{pmatrix}v_{ds}\\v_{qs}\\0\\0\end{pmatrix}-k\begin{pmatrix}R_si_{ds}\\R_si_{qs}\\\frac{R_r}{L_r}(\phi_{dr}-Mi_{ds})\\\frac{R_r}{L_r}(\phi_{qr}-Mi_{qs})\end{pmatrix}$$

Moreover, when the vector control of the induction motor is correctly operated, equations (23) to (25) are satisfied in a normal state.

$$i_{qs}=\frac{L_r}{R_r}(\omega-P_m\omega_m)i_{ds} \quad (23)$$

$$\phi_{dr}=Mi_{ds} \quad (24)$$

$$\phi_{qr}=0 \quad (25)$$

Therefore, substitution of equations (23) to (25) into equation (22) yields equation (26).

$$\frac{d}{dt}\begin{pmatrix}\phi_{ds}\\\phi_{qs}\\\phi_{dr}\\\phi_{qr}\end{pmatrix}=\begin{pmatrix}a_{11} & \omega & a_{12} & 0\\\omega & a_{11} & 0 & a_{12}\\a_{21} & 0 & a_{22} & \omega P_m\omega_m\\0 & a_{21} & (\omega P_m\omega_m) & a_{22}\end{pmatrix}\begin{pmatrix}\phi_{ds}\\\phi_{qs}\\\phi_{dr}\\\phi_{qr}\end{pmatrix}+\begin{pmatrix}v_{ds}\\v_{qs}\\0\\0\end{pmatrix}+\begin{pmatrix}R_s\\\frac{R_s}{R_r}L_r(\omega\ P_m\omega_m)\\0\\M(\omega\ P_m\omega_m)\end{pmatrix}(ki_{ds}) \quad (26)$$

When $A$, $B_1$, $B_2$, $C$, $D_2$, $w_2$ are defined by equations (27) to (32), the induction motor defined by equations (19), (26) may be represented by a block diagram shown in FIG. 1.

$$A'=\begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix} \quad (27)$$

$$B_1=\begin{pmatrix}1 & 0\\0 & 1\\0 & 0\\0 & 0\end{pmatrix} \quad (28)$$

-continued $$B_2 = \begin{pmatrix} R_s \\ \dfrac{R_s}{R_r} L_r(\omega - P_m\omega_m) \\ 0 \\ -M(\omega - P_m\omega_m) \end{pmatrix} \quad (29)$$

$$C = \begin{pmatrix} c_1 & 0 & c_2 & 0 \\ 0 & c_1 & 0 & c_2 \end{pmatrix} \quad (30)$$

$$D_2 = \begin{pmatrix} \varepsilon & 0 \\ 0 & \varepsilon \end{pmatrix} \quad (31)$$

$$w_2 = -ki_{ds} \quad (32)$$

Here, $\varepsilon$ is an arbitrary positive value that is sufficiently small, $w_1$ is an arbitrary variable. When the control subject is drawn in a manner shown in FIG. 1, in general, $B_2 \cdot w_2$ is referred to as state noise, and $D_2 \cdot w_1$ is referred to as observed noise.

Two square matrixes $H_1$, $H_2$ in the amplifying unit which minimizes the energy of an impulse response from noise $w_1$, $w_2$ to state estimation error ($\hat{\Phi}_s - \Phi_s$, $\hat{\Phi}_r - \Phi_r$) of a magnetic flux observing device in a system indicated by the block diagram of FIG. 1 are given by equation (33). Here, P is a unique solution of positive definite that satisfies equation (34) that is referred to as Riccati equation.

$$\begin{pmatrix} H_1 \\ H_2 \end{pmatrix} = PC^\tau (D_2 D_2^\tau)^{-1} \quad (33)$$

$$PA^\tau + AP - PC^\tau (D_2 D_2^\tau)^{-1} CP + B_2 B_2^\tau = 0 \quad (34)$$

Since A, $B_2$ in equation (34) are functions of the rotation angular velocity $\omega_m$ and the primary angular velocity $\omega$, $H_1$, $H_2$, given by equation (33), also form functions of the rotation angular velocity $\omega_m$ and the primary angular velocity $\omega$.

Figure 2:
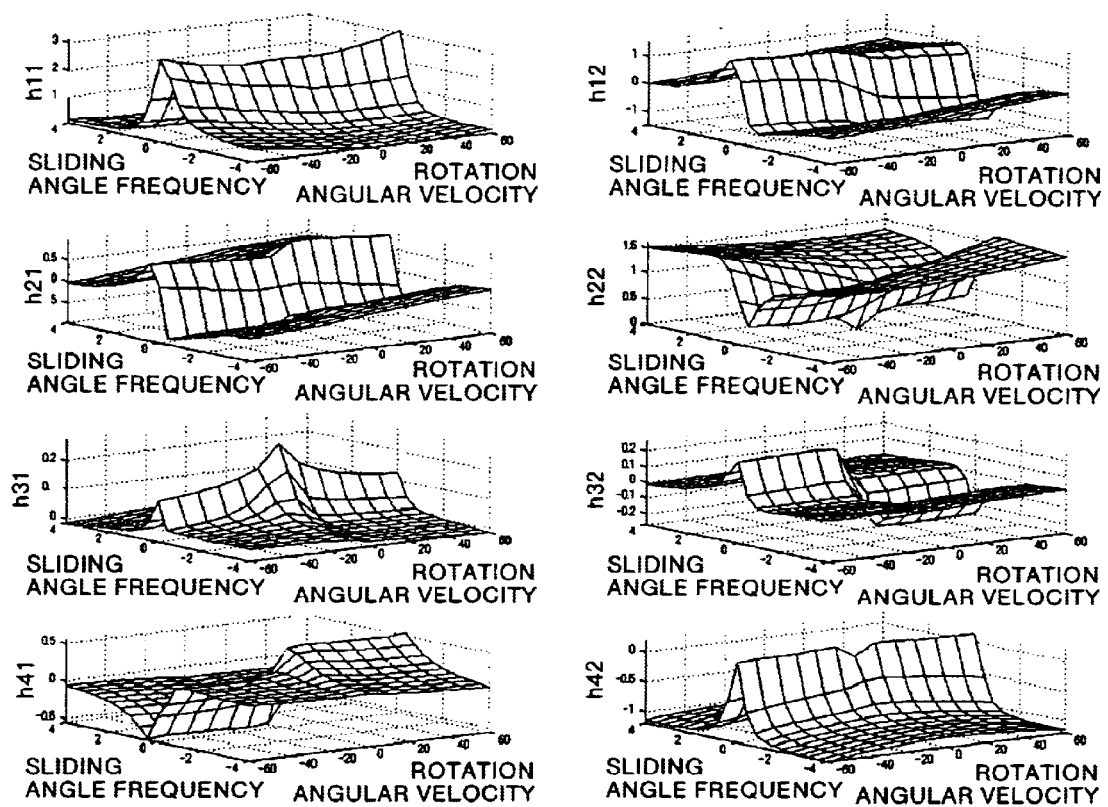
FIG. 2 shows elements of square matrixes $H_1$, $H_2$ in the control device for an induction motor that is a first embodiment of the present invention.

When the difference between $\omega$ and $P_m\omega_m$ is defined as the sliding angle frequency $\omega_s$, elements h11, h12, h21, h22, h31, h32, h41, h42 of $H_1$, $H_2$, obtained from equations (33) and (34) are given as functions shown in FIG. 2.

In the conventional control device for an induction motor, since the pole of the magnetic flux observing device is placed on the conjugate complex pole or the duplex pole, the square matrixes $K_1$, $K_2$ are made mutually commutative, however, as shown in FIG. 2, since $H_1 H_2 \neq H_2 H_1$, no commutative rule holds between the two square matrixes $H_1$, $H_2$ in the first embodiment.

Here, by coordinate-converting equation (18) to the stator polar coordinates, equations (17) to (19) can be written to equations (35) to (39).

$$\begin{pmatrix} e_1 \\ e_2 \end{pmatrix} = H_1 \begin{pmatrix} \hat{i}_{ds} - i_{ds} \\ \hat{i}_{qs} - i_{qs} \end{pmatrix} \quad (35)$$

$$\begin{pmatrix} e_3 \\ e_4 \end{pmatrix} = H_2 \begin{pmatrix} \hat{i}_{ds} - i_{ds} \\ \hat{i}_{qs} - i_{qs} \end{pmatrix} \quad (36)$$

$$\frac{d}{dt} \begin{pmatrix} \hat{\phi}_{ds} \\ \hat{\phi}_{qs} \\ \hat{\phi}_{dr} \end{pmatrix} = \begin{pmatrix} a_{11} & \omega & a_{12} \\ -\omega & a_{11} & 0 \\ a_{21} & 0 & a_{22} \end{pmatrix} \begin{pmatrix} \hat{\phi}_{ds} \\ \hat{\phi}_{qs} \\ \hat{\phi}_{dr} \end{pmatrix} + \begin{pmatrix} v_{ds} \\ v_{qs} \\ 0 \end{pmatrix} - \begin{pmatrix} e_1 \\ e_2 \\ e_3 \end{pmatrix} \quad (37)$$

$$\frac{d}{dt}\hat{\theta}(=\omega) = P_m\omega_m + \frac{a_{21}\hat{\phi}_{qs} - e_4}{\hat{\phi}_{dr}} \quad (38)$$

$$\begin{pmatrix} \hat{i}_{ds} \\ \hat{i}_{qs} \end{pmatrix} = \begin{pmatrix} c_1 & 0 & c_2 \\ 0 & c_1 & 0 \end{pmatrix} \begin{pmatrix} \hat{\phi}_{ds} \\ \hat{\phi}_{qs} \\ \hat{\phi}_{dr} \end{pmatrix} \quad (39)$$

Figure 3:
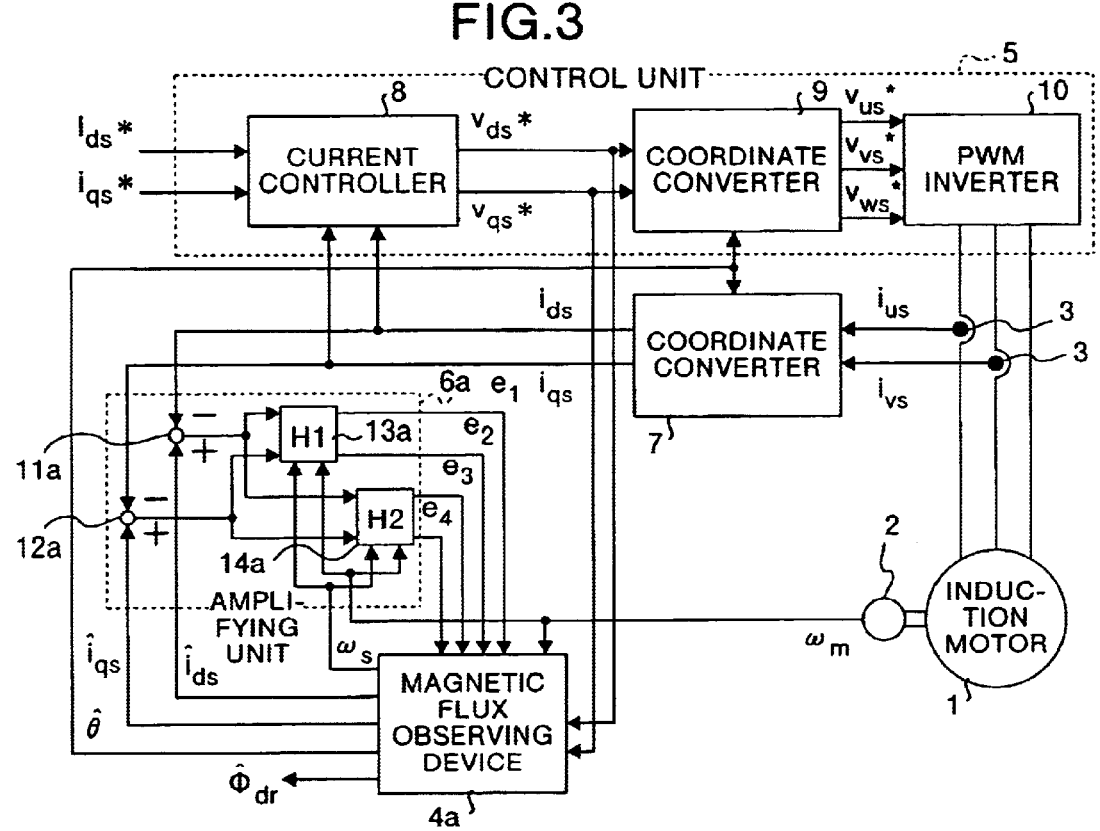
FIG. 3 is a block diagram which shows an entire construction of the control device for an induction motor that is the first embodiment of the present invention.

Here, a control device for an induction motor according to the first embodiment of the present invention will be explained. FIG. 3 is a block diagram which shows a construction of a control device for an induction motor according to the first embodiment of the present invention.

Figure 13:
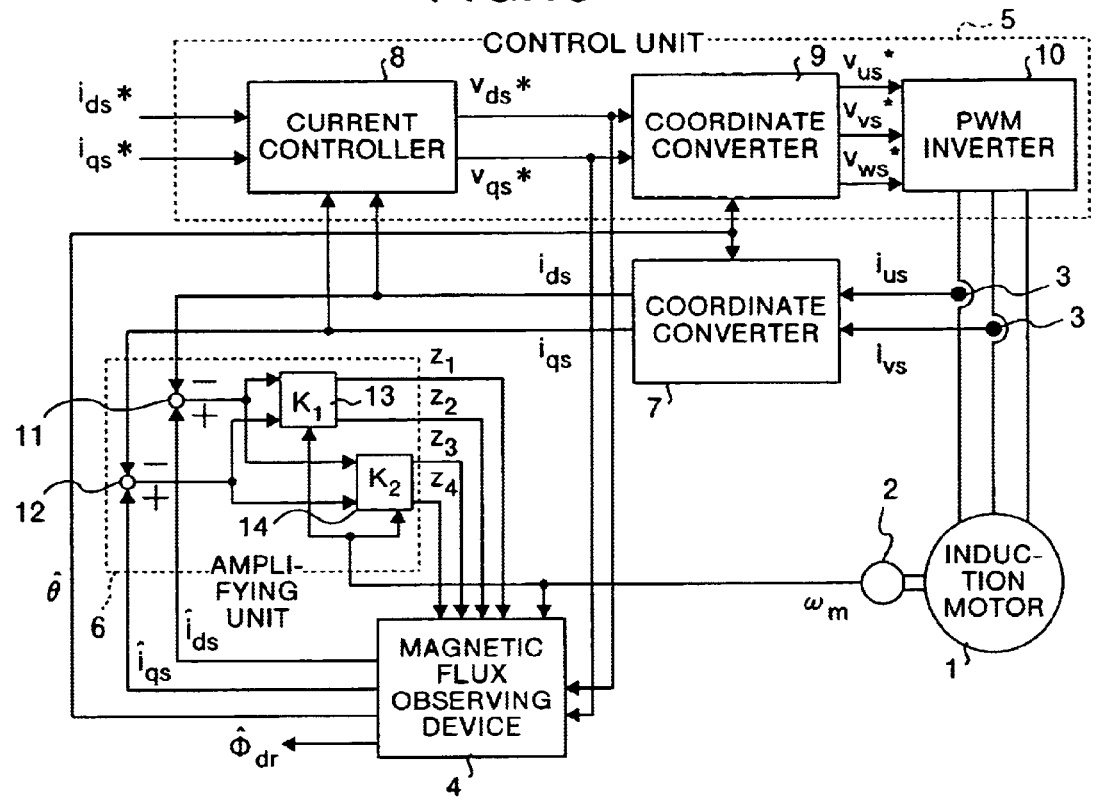
FIG. 13 is a block diagram which shows an entire construction of a conventional control device for an induction motor.
Figure 14:
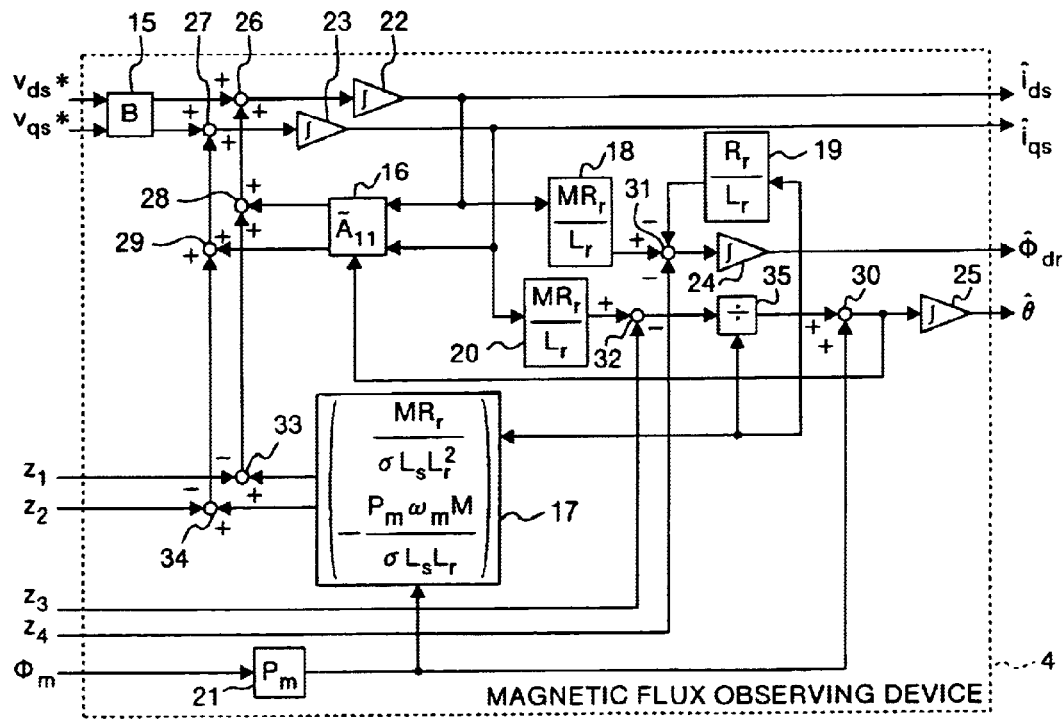
FIG. 14 is a block diagram which shows a construction of a magnetic flux observing device used for the conventional control device for an induction motor.

In FIG. 3, an induction motor 1, a rotation speed detector 2, a current detector 3, a control device 5, a coordinate converter 7, a current control device 8, a coordinate converter 9 and a PWM inverter 10 are the same as those of the conventional induction motor shown in FIG. 13.

The amplifying unit 6a is provided with subtracters 11a, 12a, gain calculators 13a, 14a. Based upon primary voltage instructions $V_{ds}^*$, $V_{qs}^*$ to be applied to the induction motor 1 and deviation signals $e_1$, $e_2$, $e_3$, $e_4$ obtained from the amplifying unit 6, the magnetic flux observing device 4a estimates the amplitude $\hat{\Phi}_{dr}$ of the estimated secondary magnetic flux, the phase $\hat{\theta}$ of the estimated secondary magnetic flux, the d-axis component $\hat{i}_{ds}$ of the estimated primary current and the q-axis component $\hat{i}_{qs}$ of the estimated primary current.

The amplifying unit 6a obtains the output of the current detector 3 as a primary current on the d–q axes via the coordinate converter 7, and amplifies the deviation of the estimated primary current on the d–q axes obtained from the magnetic flux observing device 4a and the primary current on the primary current on the d–q axes based upon the two square matrixes $H_1$, $H_2$, and outputs the resulting signals as deviation signals $e_1$, $e_2$, $e_3$, $e_4$.

In other words, the subtracter 11a calculates the deviation $\hat{i}_{ds} - i_{ds}$ between the d-axis estimated primary current $\hat{i}_{ds}$ obtained from the magnetic flux observing device 4a and d-axis primary current $i_{ds}$ obtained from the coordinate converter 7. The subtracter 12a calculates the deviation $\hat{i}_{qs} - i_{qs}$ between the q-axis estimated primary current $\hat{i}_{qs}$ obtained from the magnetic flux observing device 4a and q-axis primary current $i_{qs}$ obtained from the coordinate converter 7. The gain calculator 13a calculates deviation signals $e_1$, $e_2$ based upon the first square matrix $H_1$ of equation (33), and the gain calculator 14a calculates deviation signals $e_3$, $e_4$ based upon the second square matrix $H_2$ of equation (33).

Here, since the first square matrix and the second square matrix are functions of the rotation speed $\omega_m$ and the sliding angle frequency $\omega_s$ as shown in FIG. 2, the gain calculators 13a, 14a are provided as functions of the rotation speed $\omega_m$ obtained from the rotation speed detector 2 and the sliding angle frequency $\omega_s$ obtained from the magnetic flux observing device 4a.

Figure 4:
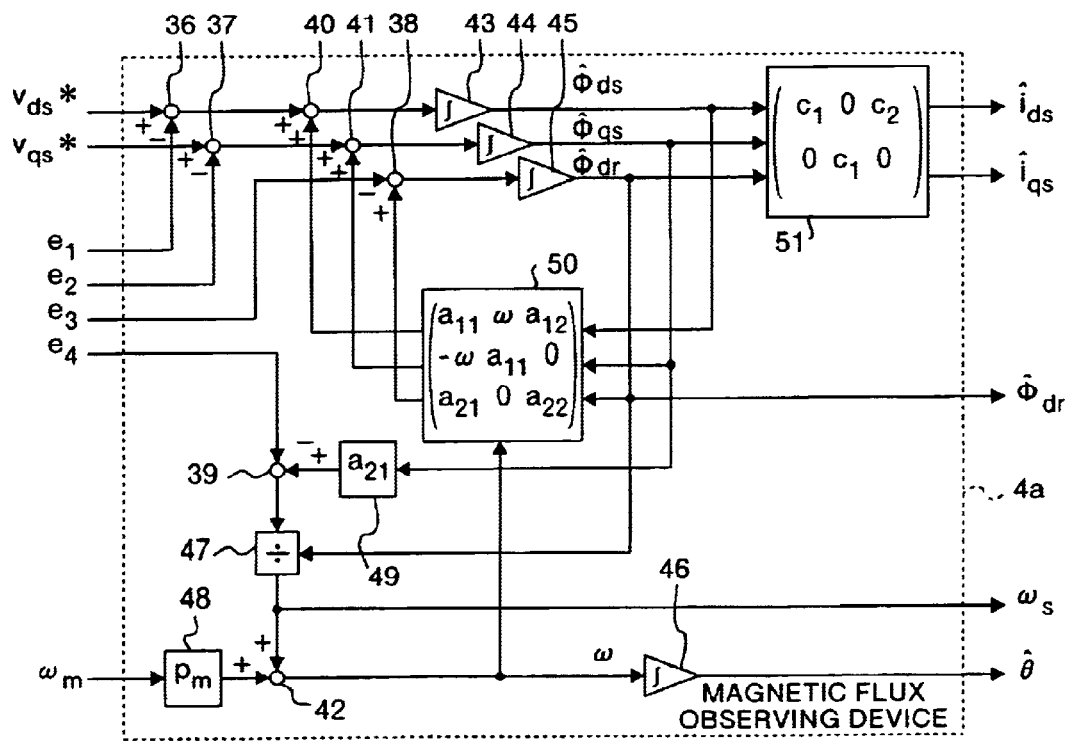
FIG. 4 is a block diagram which shows a construction of a magnetic flux observing device of the control device for an induction motor of the first embodiment of the present invention.

FIG. 4 is a block diagram which shows a construction of the magnetic flux observing device 4a. The magnetic flux observing device 4a is provided with subtracters 36 to 39, adders 40 to 42, integrators 43 to 46, a divider 47, gain calculators 48, 49 and matrix calculators 50, 51.

The matrix calculator 50 carries out matrix calculations on the first term of the right-hand side of equation (37) based upon an angle frequency $\omega$, which will be described later. The subtracters 36 to 38 and the adders 40, 41 carry out calculations on the right-hand side of equation (37) based upon the output of the matrix calculator 50 and $V_{ds}^*$, $V_{qs}^*$, $e_1$ to $e_4$ to input the differentiation value $\hat{\Phi}_{ds}$, the differentiation value $\hat{\Phi}_{qs}$, and the differentiation value $\hat{\Phi}_{dr}$ respectively to the integrator 43, the integrator 44 and the integrator 45. The integrator 43 integrates the differentiation value $\hat{\Phi}_{ds}$ to output the resulting value as $\hat{\Phi}_{ds}$. The integrator 44 integrates the differentiation value $\hat{\Phi}_{qs}$ to output the resulting value as $\hat{\Phi}_{qs}$. The integrator 45 integrates the differentiation value $\hat{\Phi}_{dr}$ to output the resulting value as $\hat{\Phi}_{dr}$.

The subtracter 39, the gain calculator 49 and the divider 47 calculate the second term on the right-hand side of equation (38), and the adder 42 adds the output of the divider 47 and the output of the gain 48 to obtain the right-hand side of equation (38), that is, the primary angle frequency ω. Here, since the output of the divider 47 corresponds to the difference of the primary angle frequency ω and the rotation angle frequency $Pm\omega_m$, this is equal to the sliding angle frequency $\omega_s$. The integrator 46 integrates the angle frequency ω to output θ. Based upon the outputs from the integrators 43 to 45, the matrix calculator 51 calculates the right-hand side of equation (39) to output $\hat{i}_{ds}$, $\hat{i}_{qs}$.

In this manner, the magnetic flux observing device 4a outputs $\hat{i}_{ds}$, $\hat{i}_{qs}$, $\hat{\Phi}_{dr}$, $\hat{\theta}$, $\omega_s$ based upon the primary voltage instructions $V_{ds}^*$, $V_{qs}^*$, the deviations $e_1$ to $e_4$ and the rotation angular velocity $\omega_m$.

Consequently, the first embodiment makes it possible to accurately control the output torque of an induction motor independent of temperature changes.

Figure 5:
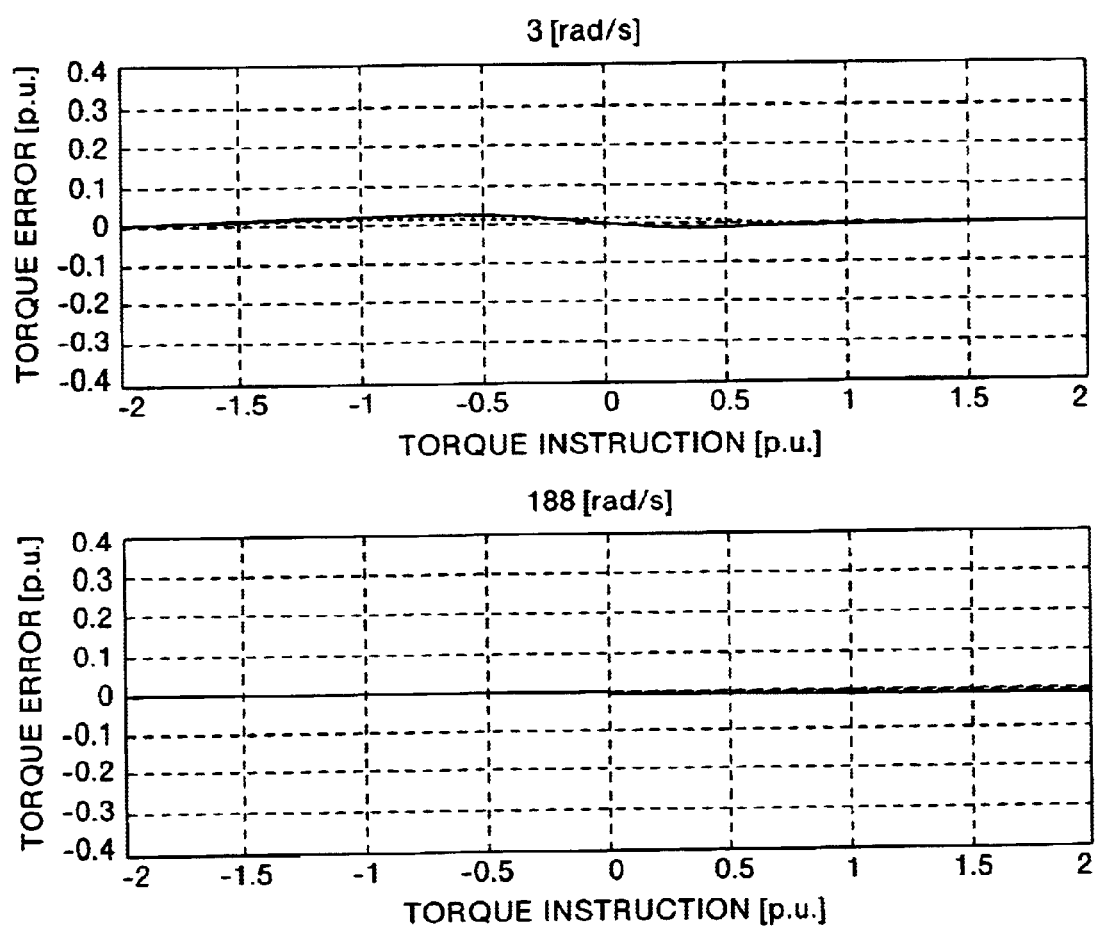
FIG. 5 shows the torque control precision of a control device for an induction motor of the first embodiment of the present invention.

FIG. 5 is a drawing which is obtained by plotting the relationship between the torque instruction and the torque error in a control device for an induction motor which is the first embodiment of the present invention. In FIG. 5, the axis of abscissas represents the torque instruction, and the axis of ordinates represent the torque error (=generated torque-torque instruction). The graph on the upper side of FIG. 5 shows a case in which the rotation speed is set to 3 [rad/s], and the graph on the lower side shows a case in which it is set to 188 [rad/s]. Moreover, the solid line shows the characteristic obtained when the secondary resistance of the induction motor has increased by a factor of 1.3, and the broken line shows the characteristic obtained when the primary resistance and the secondary resistance of the induction motor have decreased by a factor of 1/1.3.

Figure 12:
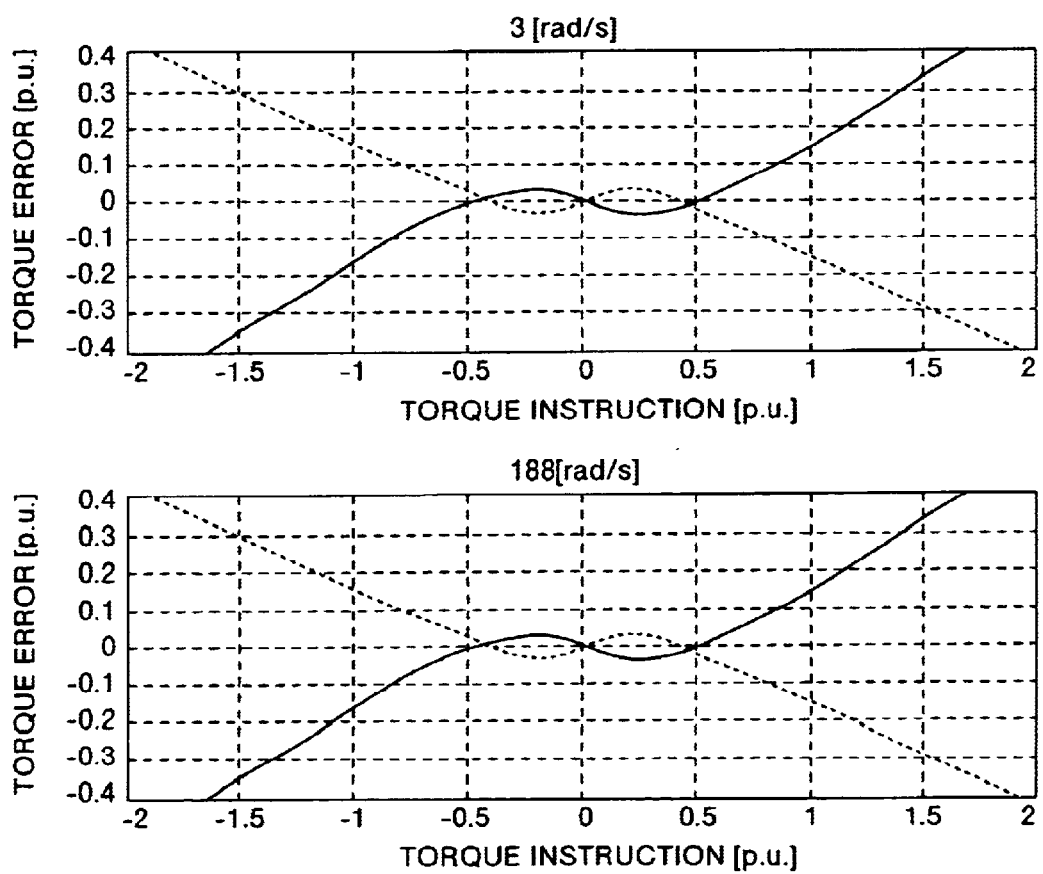
FIG. 12 shows torque control precision of a conventional device for an induction motor.
Figure 15:
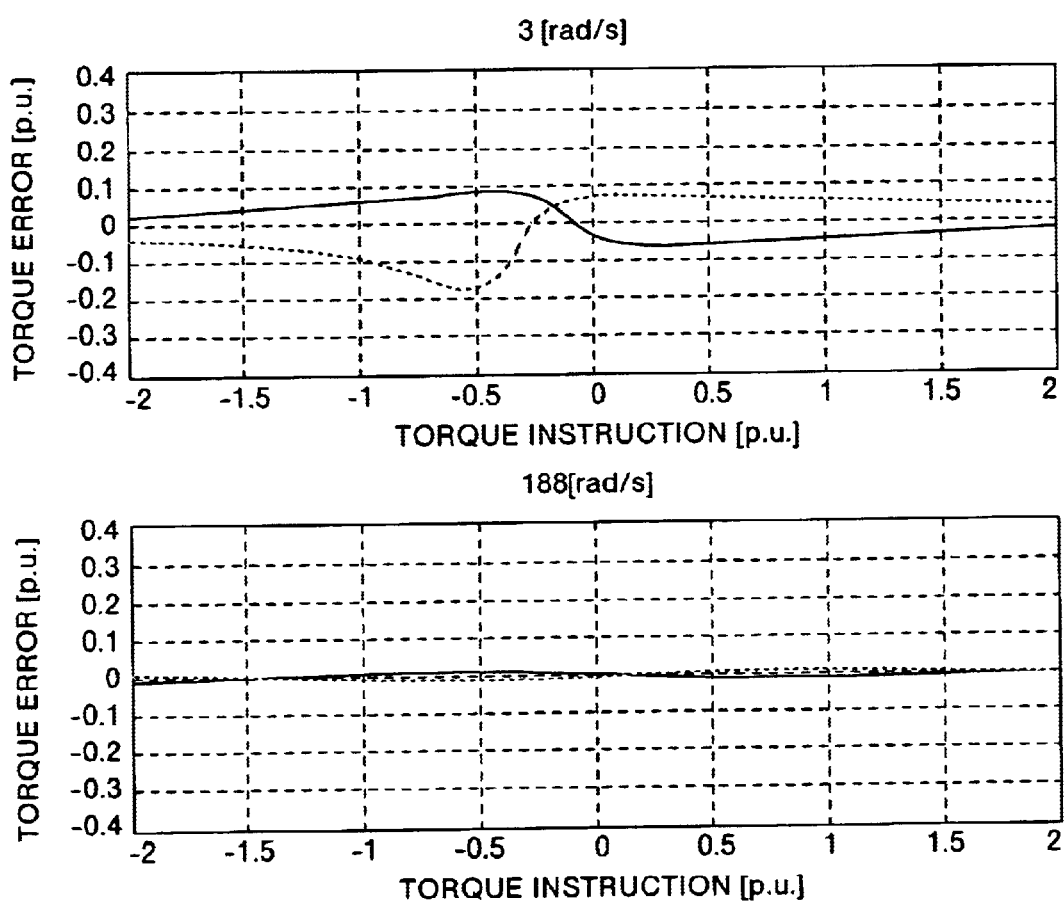
FIG. 15 shows the relationship between the torque instruction and the torque error in the conventional control device for an induction motor to which the magnetic flux observing devices shown in FIGS. 13 and 14, are applied is plotted.

As clearly seen from the comparison of FIG. 5 and FIG. 12 as well as FIG. 15, different from the conventional control device for an induction motor, the control device for an induction motor shown in the first embodiment makes it possible to suppress the torque error even when there is any resistance error, irrespective of the torque error.

Second Embodiment

A second embodiment of the present invention will now be explained. In the first embodiment, the instance in which $H_1$ and $H_2$ are set as functions between the rotation angular velocity $\omega_m$ and the sliding angle frequency $\omega_s$ have been explained, however, assuming that a load is set in a manner so as to univocally determine the relationship between the rotation angular velocity $\omega_m$ and the sliding angle frequency $\omega_s$, $H_1$ and $H_2$ may be provided as a function only related to the rotation angular velocity $\omega_m$.

For example, assuming that a load that makes the primary angle frequency ω set to a minute value Δω, the sliding angle frequency is univocally determined from the rotation angular velocity $\omega_m$ as indicated by equation (40).

$$\omega_s = \Delta\omega - P_m\omega_m \quad (40)$$

Figure 6:
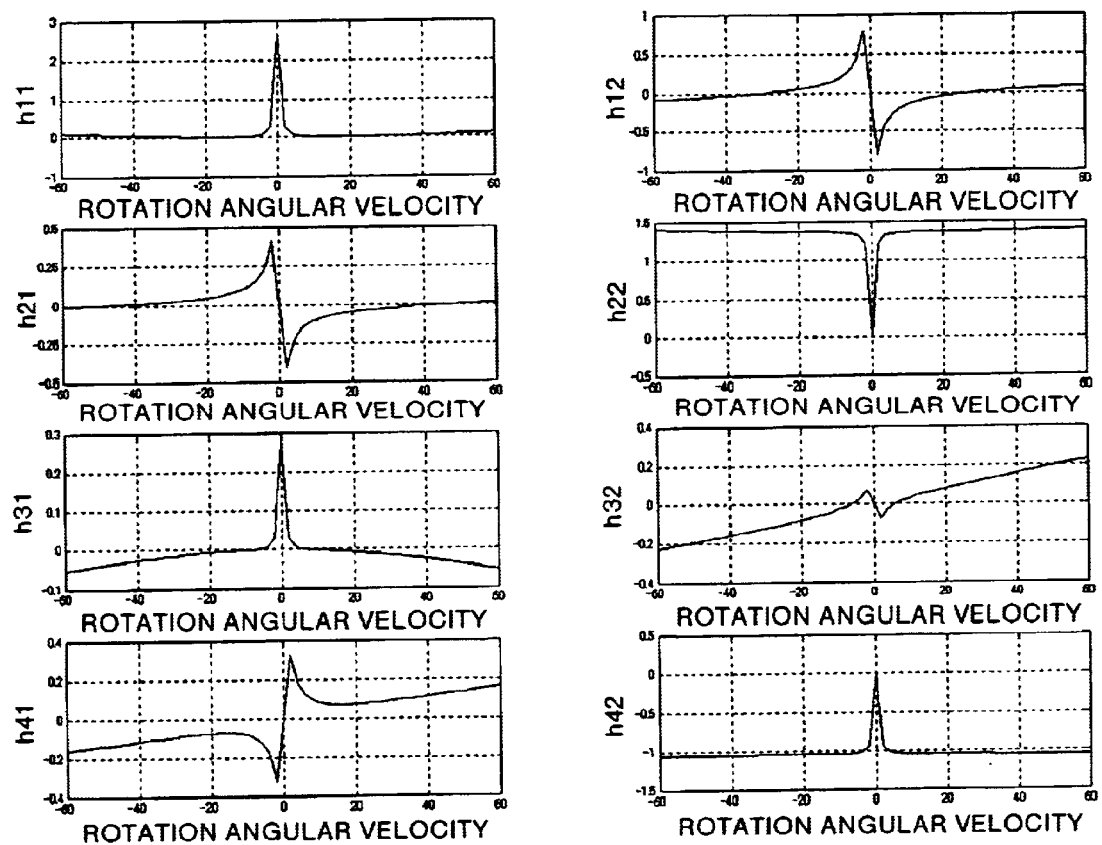
FIG. 6 shows elements of square matrixes $H_1$, $H_2$ in the control device for an induction motor that is a second embodiment of the present invention.

FIG. 6 is a drawing which shows the relationship between the rotation frequency and the elements, h11, h12, h22, h31, h32, h41, h42, of $H_1$, $H_2$ when equation (40) is satisfied. As shown in FIG. 6, no commutative rule holds between the two square matrixes $H_1$, $H_2$ in the second embodiment.

In this manner, by assuming the load that univocally determines the relationship between the rotation angular velocity $\omega_m$ and the angle frequency $\omega_m$, $H_1$, $H_2$ are provided as functions that only relate to the rotation angular velocity $\omega_m$, thereby making it possible to cut the amount of calculations in the amplifying unit.

Figure 7:
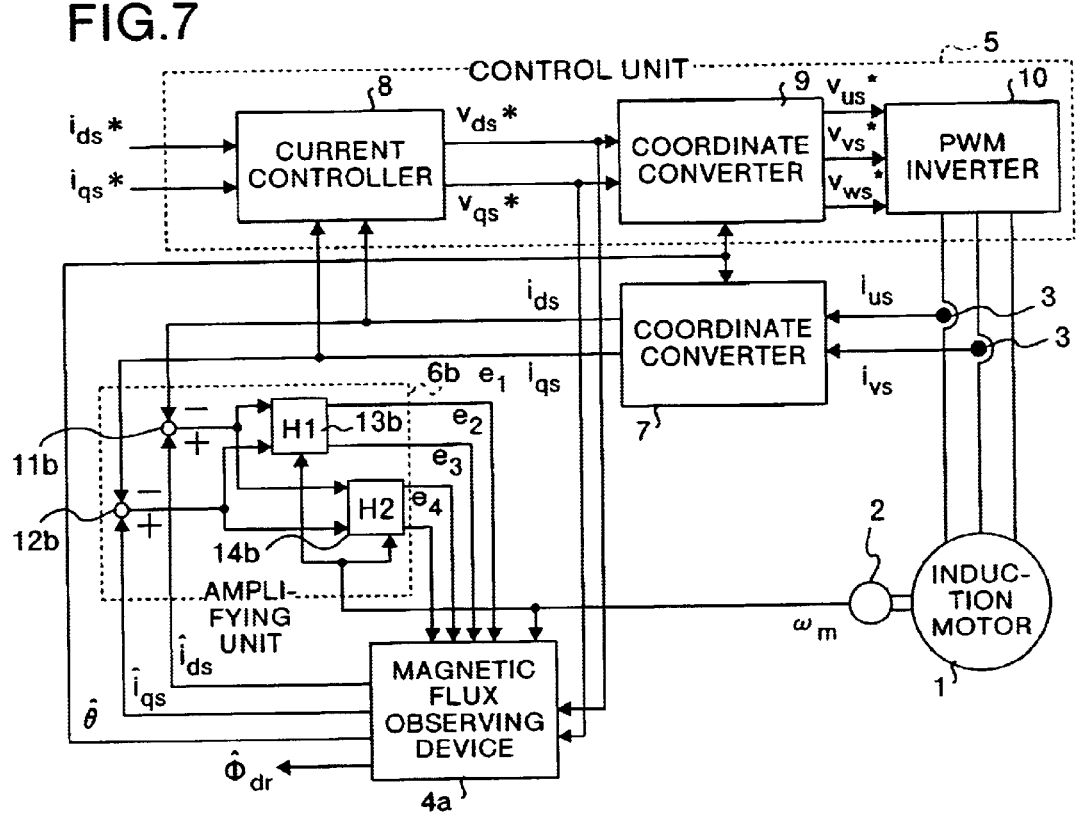
FIG. 7 is a block diagram which shows an entire construction of a control device for an induction motor that is the second embodiment of the present invention.

FIG. 7 is a block diagram which shows a construction of a control device for an induction motor that is a second embodiment of the present invention. In FIG. 7, an induction motor 1, a rotation speed detector 2, a current detector 3, a magnetic flux observing device 4a, a control unit 5, a coordinate converter 7, a current control device 8, a coordinate converter 9, and a PWM inverter 10 are the same as those of the control device of the induction motor of the first embodiment shown in FIG. 3.

The amplifying unit 6b is provided with subtracters 11b, 12b, gain calculators 13b, 14b. The amplifying unit 6b, which obtains the output of the current detector 3 as a primary current on the d–q axes via the coordinate converter 7, amplifies the deviation between the estimated primary current on the d–q axes obtained from the magnetic flux observing device 4a and the primary current on the d–q axes based upon the two square matrixes $H_1$, $H_2$, and outputs the resulting signals as deviation signals $e_1$ to $e_4$. In other words, the subtracter 11b calculates the deviation $\hat{i}_{ds} - i_{ds}$ between the d-axis estimated primary current $\hat{i}_{ds}$ obtained from the magnetic flux observing device 4a and the d-axis primary current $i_{ds}$ obtained from the coordinate converter 7, and the subtracter 12b calculates the deviation $\hat{i}_{qs} - i_{qs}$ between the q-axis estimated primary current $\hat{i}_{qs}$ obtained from the magnetic flux observing device 4a and the q-axis primary current $i_{qs}$ obtained from the coordinate converter 7, and the gain calculator 13b calculates deviation signals $e_1$, $e_2$ based upon the first square matrix $H_1$. The gain calculator 14b calculates deviation signals $e_3$, $e_4$ based upon the second square matrix $H_2$.

As shown in FIG. 6, the first square matrix and the second square matrix are functions of the rotation angular velocity, therefore, the gain calculators 13b, 14b provide functions of the rotation speed obtained from the rotation speed detector 2.

Figure 8:
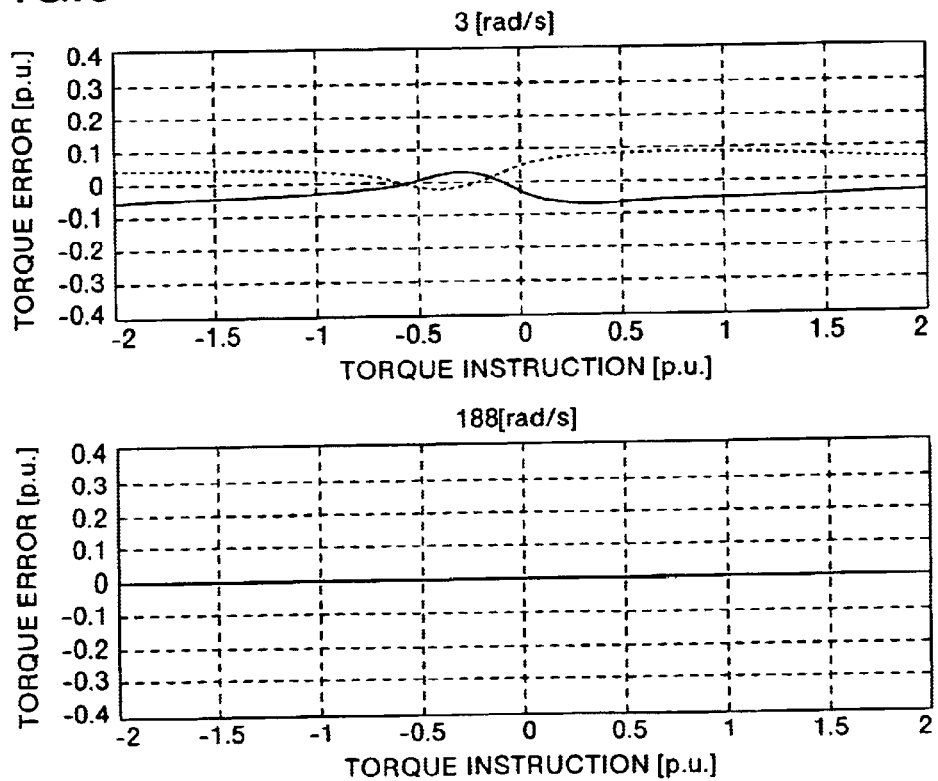
FIG. 8 shows the torque control precision of the control device for an induction motor of the second embodiment of the present invention.

FIG. 8 is a drawing in which the relationship between the torque instruction and the torque error in a control device for an induction motor that is the second embodiment of the present invention. In FIG. 8, the axis of abscissas represents the torque instruction, and the axis of ordinates represents the torque error (=generated torque-torque instruction). The graph on the upper side of FIG. 8 shows a case in which the rotation speed is set to 3 [rad/s] and the graph on the lower side of FIG. 8 shows a case in which it is set to 188 [rad/s]. Moreover, the solid line represents a characteristic at the time when the primary resistance and the secondary resistance of the induction motor 1 have increased by a factor of 1.3, and the broken line represents a characteristic when the primary resistance and the secondary resistance of the induction motor 1 have reduced by a factor of 1/1.3.

As seen from the comparisons of FIG. 8 and FIG. 12 as well as FIG. 15, in comparison with the conventional control device, the control device of the second embodiment makes it possible to suppress the torque error independent of the rotation angular velocity, even when there is any resistance error.

Third Embodiment

A third embodiment of the present invention will now be explained. In the second embodiment, the amplifying unit 6b obtains square matrixes $H_1$ and $H_2$ based upon the rotation angular velocity, however, the square matrixes $H_1$ and $H_2$ may be obtained based upon the sliding angle frequency in place of the rotation angular velocity, and in this case also, the same effects as the second embodiment can be obtained.

Figure 9:
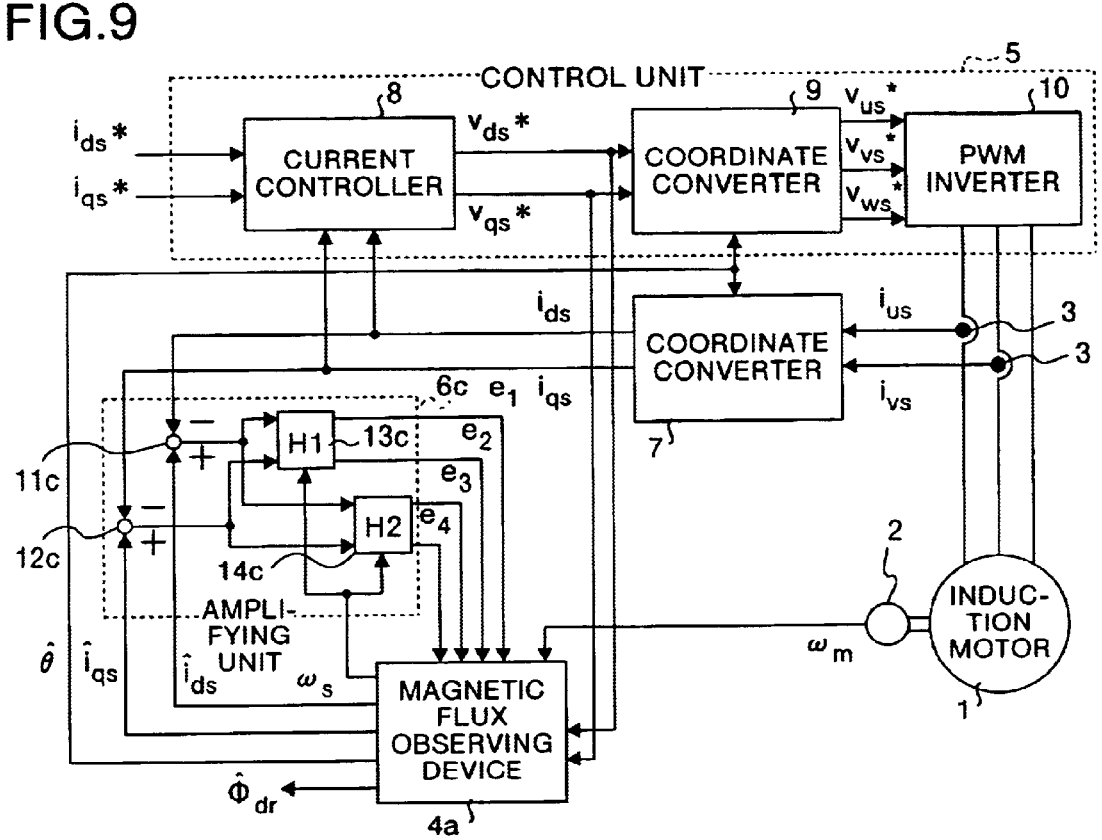
FIG. 9 is a block diagram which shows an entire construction of a control device for an induction motor that is a third embodiment of the present invention.

FIG. 9 is a block diagram which shows a construction of a control device for an induction motor that is the third embodiment of the present invention. In FIG. 9, an induction motor 1, a rotation speed detector 2, a current detector 3, a magnetic flux observing device 4a, a control unit 5, a coordinate converter 7, a current control device 8, a coordinate converter 9, and a PWM inverter 10 are the same as those of the control device of the induction motor of the first embodiment shown in FIG. 3.

$$\frac{d}{dt}\begin{pmatrix}\phi_{ds}\\\phi_{qs}\\\phi_{dr}\\\phi_{qr}\end{pmatrix} = \begin{pmatrix}a_{11} & \omega & a_{12} & 0\\-\omega & a_{11} & 0 & a_{12}\\a_{12}+\Delta a_{21} & 0 & a_{22}+\Delta a_{22} & \omega-P_m\omega_m\\0 & a_{21}+\Delta a_{21} & -(\omega-P_m\omega_m) & a_{22}+\Delta a_{22}\end{pmatrix}\begin{pmatrix}\phi_{ds}\\\phi_{qs}\\\phi_{dr}\\\phi_{qr}\end{pmatrix} + \begin{pmatrix}v_{ds}\\v_{qs}\\0\\0\end{pmatrix} \quad (41)$$

$$= \begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix}\begin{pmatrix}\phi_{ds}\\\phi_{qs}\\\phi_{dr}\\\phi_{qr}\end{pmatrix} + \begin{pmatrix}v_{ds}\\v_{qs}\\0\\0\end{pmatrix} + \begin{pmatrix}0 & 0 & 0 & 0\\0 & 0 & 0 & 0\\\Delta a_{21} & 0 & \Delta a_{22} & 0\\0 & \Delta a_{21} & 0 & \Delta a_{22}\end{pmatrix}\begin{pmatrix}\phi_{ds}\\\phi_{qs}\\\phi_{dr}\\\phi_{qr}\end{pmatrix}$$

$$= \begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix}\begin{pmatrix}\phi_{ds}\\\phi_{qs}\\\phi_{dr}\\\phi_{qr}\end{pmatrix} + \begin{pmatrix}v_{ds}\\v_{qs}\\0\\0\end{pmatrix} - k\begin{pmatrix}0\\0\\\frac{R_r}{L_r}(\phi_{dr}-Mi_{ds})\\\frac{R_r}{L_r}(\phi_{qr}-Mi_{qs})\end{pmatrix}$$

The amplifying unit 6c is provided with subtracters 11c, 12c, gain calculators 13c, 14c. The amplifying unit 6c, which obtains the output of the current detector 3 as a primary current on the d–q axes via the coordinate converter 7, amplifies the deviation between the estimated primary current on the d–q axes obtained from the magnetic flux observing device 4a and the primary current on the d–q axes based upon the two square matrixes $H_1$, $H_2$, and outputs the resulting signals as deviation signals $e_1$ to $e_4$.

In other words, the subtracter 11c calculates the deviation $\hat{i}_{ds}-i_{ds}$ between the d-axis estimated primary current $\hat{i}_{ds}$ obtained from the magnetic flux observing device 4a and the d-axis primary current $i_{ds}$ obtained from the coordinate converter 7, and the subtracter 12b calculates the deviation $\hat{i}_{qs}-i_{qs}$ between the q-axis estimated primary current $\hat{i}_{qs}$ obtained from the magnetic flux observing device 4a and the q-axis primary current $i_{qs}$ obtained from the coordinate converter 7, and the gain calculator 13c calculates deviation signals $e_1$, $e_2$ based upon the first square matrix $H_1$. The gain calculator 14c calculates deviation signals $e_3$, $e_4$ based upon the second square matrix $H_2$.

The first square matrix and the second square matrix are functions of the sliding angle frequency, therefore, the gain calculators 13b, 14c provide functions of the sliding angle frequency obtained from the magnetic flux observing device 4a.

Fourth Embodiment

A fourth embodiment of the present invention will now be explained. In the square matrixes $H_1$ and $H_2$ shown in the first to third embodiments, instances in which both of the primary resistance and the secondary resistance have errors have been explained, however, with respect to instances in which only the secondary resistance has errors, the square matrixes $H_1$ and $H_2$ can be determined in the same manner.

In general, the temperature of the primary resistance of an induction motor is detected by a temperature detector using a thermocouple, etc. It is possible to calculate the primary resistance value of the induction motor by using the detected temperature. However, as for a squirrel-cage induction motor, it is difficult to measure the temperature of the secondary resistance by using a temperature detector such as a thermocouple, etc.

Therefore, an instance in which $R_s$ is a known value and $R_r$ is changed to (1+k) times will be explained. When $R_r$ is changed to (1+k) times with $R_s$ being a known value, equations (14), (15) can be written to the following equation (41).

As described above, when the vector control of the induction motor is operated correctly, equations (23) to (25) are allowed to hold in a normal state. Therefore, substitution of equations (23) to (25) into equation (41) yields the following equation (42).

$$\frac{d}{dt}\begin{pmatrix}\phi_{ds}\\\phi_{qs}\\\phi_{dr}\\\phi_{qr}\end{pmatrix} = \qquad (42)$$

$$\begin{pmatrix}a_{11} & \omega & a_{12} & 0\\-\omega & a_{11} & 0 & a_{12}\\a_{21} & 0 & a_{22} & \omega-P_m\omega_m\\0 & a_{21} & -(\omega-P_m\omega_m) & a_{22}\end{pmatrix}\begin{pmatrix}\phi_{ds}\\\phi_{qs}\\\phi_{dr}\\\phi_{qr}\end{pmatrix} + \begin{pmatrix}v_{ds}\\v_{qs}\\0\\0\end{pmatrix} + \begin{pmatrix}0\\0\\0\\1\end{pmatrix}k\omega_s$$

$$B_2 = \begin{pmatrix}0\\0\\0\\1\end{pmatrix} \qquad (43)$$

$$w_2 = k\omega_s \qquad (45)$$

Then, $B_2$ is given to equation (43) instead of equation (29), and $w_2$ is given to equation (44) instead of equation (32), thus, the induction motor constituted by equations (19), (42) can be represented as FIG. 1.

$B_2$ and $w_2$ are re-defined respectively by equation (43) and equation (44), and two square matrixes $H_1$, $H_2$ are given by equation (33), thus, it becomes possible to control the torque error even when only the secondary resistance has any error.

In the same manner as the first embodiment, since A in equation (34) is a function of the rotation angular velocity $\omega_m$ and the primary angle frequency $\omega$, $H_1$ and $H_2$, given by equation (33), are also functions of the rotation angular velocity $\omega_m$ and the primary angle frequency $\omega$.

In the same manner as the first to third embodiments, no commutative rule holds between the two square matrixes $H_1$, $H_2$ in the same manner as the first to third embodiments.

Figure 10:
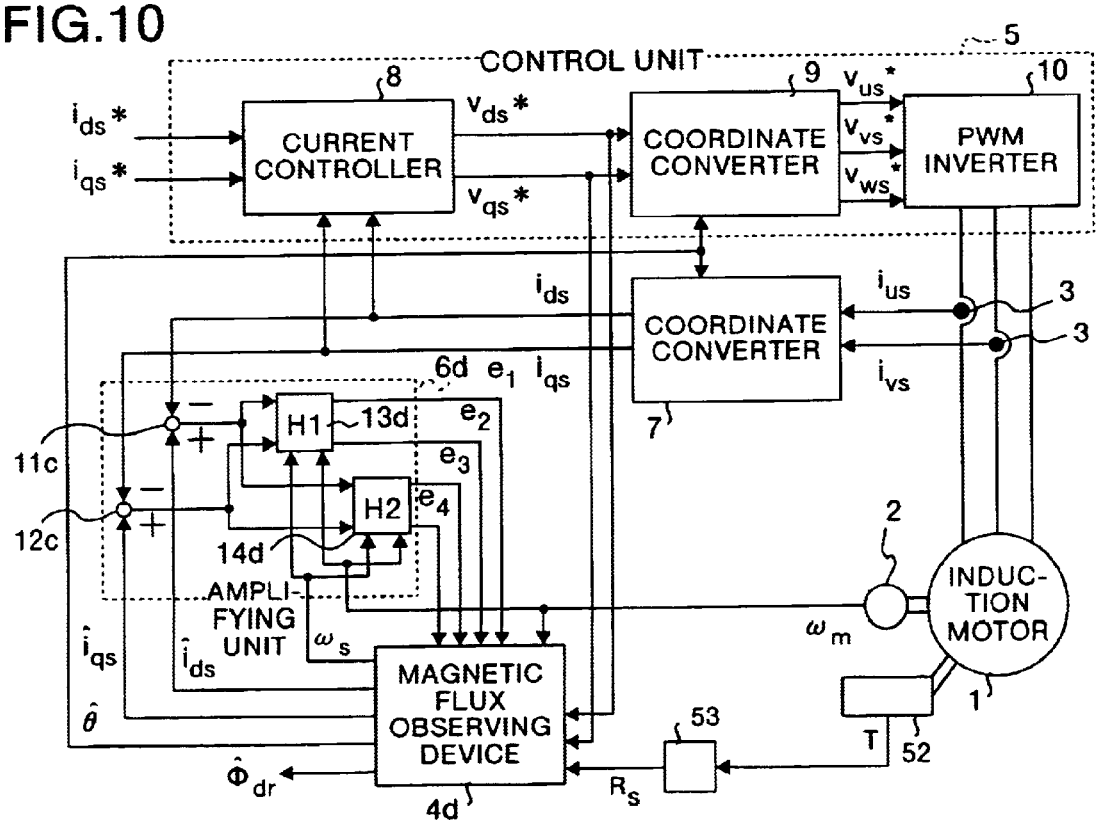
FIG. 10 is a block diagram which shows an entire construction of a control device for an induction motor that is a fourth embodiment of the present invention.

FIG. 10 is a block diagram which shows a construction of a control device for an induction motor that is the fourth embodiment of the present invention. In FIG. 10, an induction motor 1, a rotation speed detector 2, a current detector 3, a control device 5, a coordinate converter 7, a current control device 8, a coordinate converter 9 and a subtracter 10 are the same as those of the control device of the induction motor of the first embodiment shown in FIG. 3.

A temperature detector 52 measures the temperature of the primary resistance of the induction motor 1. A resistance value calculator 53 outputs the primary resistance value $R_s$ based upon the temperature T of the primary resistance from the temperature detector 52. The magnetic flux observing device 4d is the same as the magnetic flux observing device 4a except that the value obtained from the resistance value calculator 53 as the primary resistance $R_s$.

The amplifying unit 6d is provided with subtracters 11d, 12d and gain calculators 13d, 14d. The amplifying unit 6d is the same as the amplifying unit 6a except that two square matrixes $H_1$, $H_2$ that are obtained based upon $B_2$, $W_2$ defined by equations (43), (44) are used.

With this arrangement, it becomes possible to suppress torque errors even when the secondary resistance value has errors due to the influences of temperature conversion.

Fifth Embodiment

A fifth embodiment will now be explained. When the two square matrixes $H_1$, $H_2$ are applied to the amplifying unit, it is possible to improve the precision of the amplification value $\hat{\Phi}_{dr}$ of the estimated secondary magnetic flux that is calculated by the magnetic flux observing device.

Figure 11:
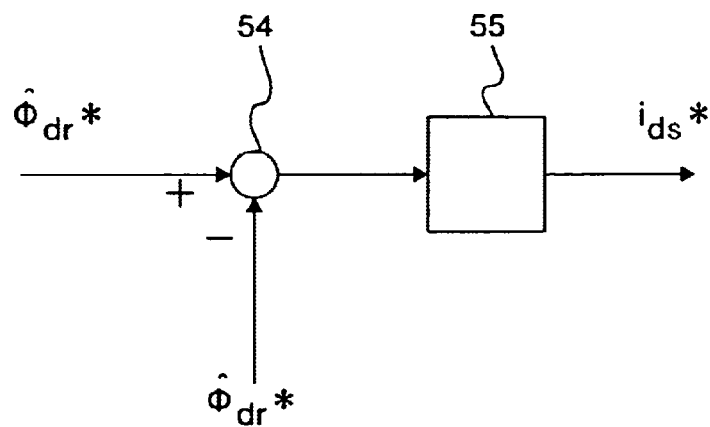
FIG. 11 shows a circuit construction that is used for a fifth embodiment of the present invention and that finds $i_{ds}^*$ from $\Phi_{dr}$ and $\hat{\Phi}_{dr}$.

Therefore, by using a circuit construction as shown in FIG. 11, the d-axis current instruction $i_{ds}*$ may be determined so as to set the amplitude of the estimated secondary magnetic flux to a desired secondary magnetic flux amplitude value. In FIG. 11, the subtracter 54 calculates the deviation between a desired secondary magnetic flux amplitude value $\hat{\Phi}_{ds}*$ and the estimated secondary magnetic flux $\hat{\Phi}_{dr}$ output from the magnetic flux observing device, and the amplifying device 55 amplifies the output of the subtracter 54, and outputs the resulting signal as the d-axis current instruction $i_{ds}*$.

Sixth Embodiment

A sixth embodiment of the present invention will be explained. In the embodiments, there have been explained square matrixes $H_1$, $H_2$ when the resistance value has errors, however, with respect to any errors in motor constants, such as mutual inductance M, primary inductance Ls and secondary inductance Lr, by appropriately determining either the matrix $B_1$ or the matrix $D_2$ or both of the matrix $B_1$ and the matrix $D_2$, it, of course, becomes possible to determine $H_1$, $H_2$ so as to reduce degradation in the torque control precision.

INDUSTRIAL APPLICABILITY

The present invention relates to a control device for an induction motor that can control the torque generation in the induction motor with high precision, and in particular, the control device for an induction motor is preferably used for an apparatus requiring torque control with high precision at low speeds, such as an electric car and a printing machine.

What is claimed is:

1. A control device for an induction motor comprising:

a rotation speed detector which detects the rotation speed of an induction motor;

a current detector which detects a primary current of said induction motor;

a magnetic flux observing device which estimates an estimated secondary magnetic flux and an estimated primary current of the induction motor based upon the rotation speed obtained from said rotation speed detector, a primary voltage of said induction motor, and a deviation signal;

an amplifying unit which amplifies a deviation between the estimated primary current obtained from said magnetic flux observing device and the primary current obtained by said current detector to produce the deviation signal; and a control unit which controls a voltage to be applied to the induction motor based upon the estimated secondary magnetic flux obtained from said magnetic flux observing device, wherein said amplifying unit amplifies the deviation based upon feedback gain determined by eight respectively independent factors.

2. The control device for an induction motor according to claim 1, wherein said amplifying unit determines the feedback gain based upon rotation angular velocity of the induction motor.

3. The control device for an induction motor according to claim 1, wherein said amplifying unit determines the feedback gain based upon sliding angle frequency of the induction motor.

4. The control device for an induction motor according to claim 1, wherein said amplifying unit determine the feedback pain based upon both rotation angular velocity and sliding angle frequency of the induction motor.

5. The control device for an induction motor according to claim 1, wherein the feedback gain $$\begin{pmatrix} H_1 \\ H_2 \end{pmatrix}$$

satisfies the following equations, $$\begin{pmatrix} H_1 \\ H_2 \end{pmatrix} = PC^\tau (D_2 D_2^\tau)^{-1}$$

where $$PA^\tau + AP - PC^\tau(D_2 D_2^\tau)^{-1}CP + B_2 B_2^\tau = 0$$

$$A' = \begin{pmatrix} a_{11} & \omega & a_{12} & 0 \\ -\omega & a_{11} & 0 & a_{12} \\ a_{21} & 0 & a_{22} & \omega - P_m \omega_m \\ 0 & a_{21} & -(\omega - P_m \omega_m) & a_{22} \end{pmatrix}$$

$$C = \begin{pmatrix} c_1 & 0 & c_2 & 0 \\ 0 & c_1 & 0 & c_2 \end{pmatrix}$$

-continued $$a_{11} = -\zeta^{-1}L_rR_s$$
$$a_{12} = \zeta^{-1}MR_s$$
$$a_{21} = \zeta^{-1}MR_r$$
$$a_{22} = -\zeta^{-1}L_sR_r$$
$$c_1 = \zeta^{-1}L_r$$
$$c_2 = -\zeta^{-1}M$$
$$\zeta = L_sL_r - M^2$$

$B_2$: arbitrary matrix,
$D_2$: arbitrary matrix,
$\omega$: primary angular velocity of the induction motor
$\omega_m$: rotation angular velocity of the induction motor
$\omega_s$: sliding angular velocity of the induction motor
$P_m$: polar logarithm
$R_s$: primary resistance value of the induction motor
$R_r$: secondary resistance value of the induction motor
$L_s$: primary inductance value of the induction motor
$L_r$: secondary inductance value of the induction motor
$M$: mutual inductance value of the induction motor.

6. The control device for an induction motor according to claim 5, wherein $$B_2 = \begin{pmatrix} R_s \\ \dfrac{R_s}{R_r}L_r(\omega - P_m\omega_m) \\ 0 \\ -M(\omega - P_m\omega_m) \end{pmatrix} \quad \text{and} \quad D_2 = \begin{pmatrix} \varepsilon & 0 \\ 0 & \varepsilon \end{pmatrix}.$$

7. The control device for an induction motor according to claim 5, wherein $$B_2 = \begin{pmatrix} 0 \\ 0 \\ 0 \\ 1 \end{pmatrix} \quad \text{and} \quad D_2 = \begin{pmatrix} \varepsilon & 0 \\ 0 & \varepsilon \end{pmatrix}.$$

* * * * *